United States Patent
Yarbrough et al.

(10) Patent No.: US 11,065,703 B1
(45) Date of Patent: Jul. 20, 2021

(54) EMISSIONS COLLECTION SYSTEM AND METHODS

(71) Applicant: Commercial Metals Company, Irving, TX (US)

(72) Inventors: Brett Yarbrough, Fort Worth, TX (US); Martin Allen Swayze, Seguin, TX (US); Randall Walker, Floresville, TX (US)

(73) Assignee: COMMERCIAL METALS COMPANY, Irving, TX (US)

( * ) Notice: Subject to any disclaimer, the term of this patent is extended or adjusted under 35 U.S.C. 154(b) by 0 days.

(21) Appl. No.: 17/015,611

(22) Filed: Sep. 9, 2020

Related U.S. Application Data

(60) Provisional application No. 62/897,612, filed on Sep. 9, 2019.

(51) Int. Cl.
*B23K 7/10* (2006.01)
*B01D 46/00* (2006.01)
*C22B 1/00* (2006.01)

(52) U.S. Cl.
CPC ............ *B23K 7/10* (2013.01); *B01D 46/0023* (2013.01); *C22B 1/005* (2013.01); *B01D 2279/51* (2013.01)

(58) Field of Classification Search
CPC .. B01D 46/0023; B01D 2279/51; B23K 7/10; C22B 1/005
USPC ..... 55/385.1, 472, 312; 95/12, 22, 214, 277; 454/60, 63, 233, 187
See application file for complete search history.

(56) References Cited

U.S. PATENT DOCUMENTS

| | | | | |
|---|---|---|---|---|
| 5,709,721 A | * | 1/1998 | Stueble | B01D 46/0023 55/312 |
| 5,817,158 A | * | 10/1998 | Cox | B01D 46/002 55/472 |
| 6,077,473 A | | 6/2000 | Diederich et al. | |
| 6,391,093 B1 | * | 5/2002 | French | B23K 26/1435 95/214 |
| 6,726,736 B2 | | 4/2004 | Koclejda et al. | |
| 6,770,108 B2 | * | 8/2004 | Cherry, Sr. | B01D 46/10 210/435 |
| 7,503,951 B2 | * | 3/2009 | Dudash | B01D 46/446 55/385.1 |
| 8,979,959 B2 | | 3/2015 | Roughton | |
| 9,498,805 B2 | * | 11/2016 | Hammers | B08B 15/02 |
| 2008/0083333 A1 | * | 4/2008 | Yokoi | B01D 46/26 95/277 |
| 2009/0145130 A1 | * | 6/2009 | Kaufman | F25J 1/0012 60/722 |

(Continued)

*Primary Examiner* — Minh Chau T Pham
(74) *Attorney, Agent, or Firm* — Haynes and Boone, LLP

(57) ABSTRACT

An emissions collection system that includes a containment system, the containment system including a plurality of walls and a roof structure that together form an internal chamber; wherein chamber inlets are formed in one wall of the plurality of walls; and wherein chamber outlets are formed in either another wall of the plurality of walls or the roof structure. A filter assembly includes a filter that collects emissions generated within the internal chamber; and a duct system that places the chamber outlets in fluid communication with the filter assembly; wherein the filter assembly is sized and configured to move air through the chamber inlets, the internal chamber, the chamber outlets, the duct system, and the filter to collect emissions generated within the internal chamber.

22 Claims, 15 Drawing Sheets

(56) References Cited

U.S. PATENT DOCUMENTS

| | | | |
|---|---|---|---|
| 2014/0197141 A1* | 7/2014 | Dorey | B23K 26/127 219/121.63 |
| 2014/0366721 A1* | 12/2014 | Roy | B01D 46/444 95/22 |
| 2015/0101482 A1* | 4/2015 | Chou | B08B 17/00 95/12 |
| 2015/0209462 A1* | 7/2015 | Turbett | B01D 46/0002 436/1 |
| 2016/0194010 A1* | 7/2016 | Pettibone | B61D 39/002 105/377.09 |
| 2019/0291220 A1 | 9/2019 | Schutz et al. | |

\* cited by examiner

_US 11,065,703 B1_

EMISSIONS COLLECTION SYSTEM AND METHODS

CROSS REFERENCE TO RELATED APPLICATION

This application claims the benefit of the filing date of, and priority to, U.S. Application No. 62/897,612, filed Sep. 9, 2019, the entire disclosure of which is hereby incorporated herein by reference.

TECHNICAL FIELD

The present disclosure relates generally to an emissions collection system and methods of use.

BACKGROUND DESCRIPTION

In the process of recycling large elements formed from steel, torch cutting is used to break the large elements into more manageable pieces. For example, windmill hubs that are no longer efficient or have otherwise reached the end of their design life may be broken down via torch cutting. Often, the windmill hubs are largely composed of steel, but can also include other metals and/or coating(s) that produce emissions when exposed to high temperatures (e.g., during torch cutting). Moreover, the torching activities themselves may produce emissions separately from the materials being torched. Often, when the emissions produced from the torching activities are high and/or are very visible, torching activities are performed within a contained area and/or near a filter assembly. Due to the size and weight of the windmill hubs, however, it is impossible or impractical to position the hubs in conventional emissions collection systems.

DETAILED DESCRIPTION

Figure 1:
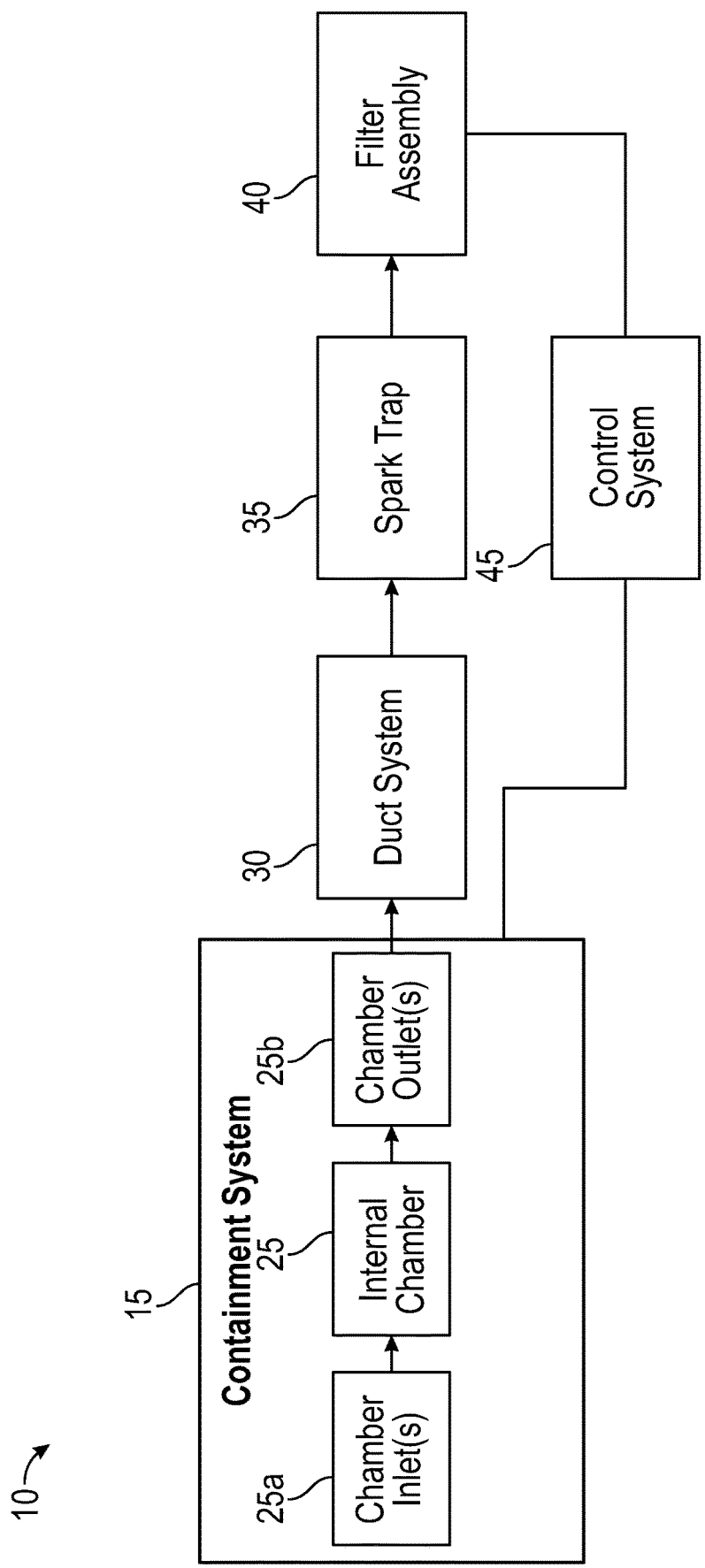
FIG. 1 is a diagrammatic illustration of an emissions collection system, the emissions collection system including a containment system, a duct system, a spark trap, a filter assembly, and a control system.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In an example embodiment and as illustrated in FIG. 1, an emissions collection system is generally referred to by the reference numeral 10 and includes a containment system 15 forming an internal chamber 25 having chamber inlet(s) 25a and chamber outlet(s) 25b. The system 10 also includes a duct system 30 that places the containment system 15 in fluid communication with a spark trap 35, which, in turn, is in fluid communication with a filter assembly 40. The system 10 also includes a control system 45 that is in communication with the containment system 15 and the filter assembly 40.

Generally, the emissions collection system 10 is sized and configured such that large elements can be positioned within the containment system 15 during torching activities. Emissions from the torching activities are contained by the duct system 30 and the filter assembly 40, which push, move, and/or draw air through the chamber inlet(s) 25a into the internal chamber 25, and from the internal chamber 25 into the duct system 30 via the chamber outlet(s) 25b. The duct system 30 conveys the air and emissions through the spark trap 35, which prevents sparks from entering the filter assembly 40. The air and emissions flow into the filter assembly 40. The emissions are filtered from the air and collected within the filter assembly 40. The clean air exits the filter assembly 40.

Figure 2:
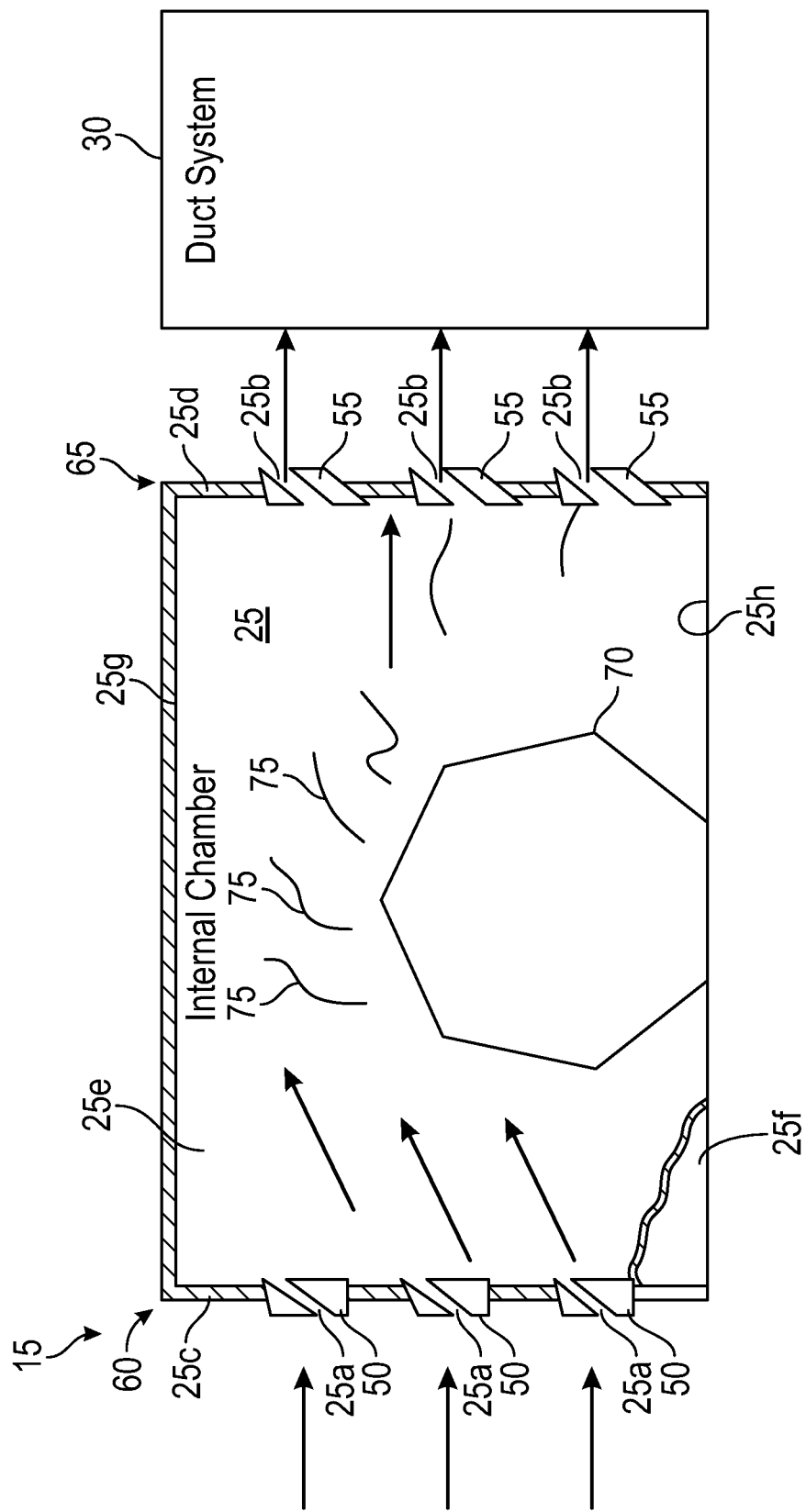
FIG. 2 is a diagrammatic illustration of the containment system and the duct system of FIG. 1, according to an example embodiment.
Figure 3:
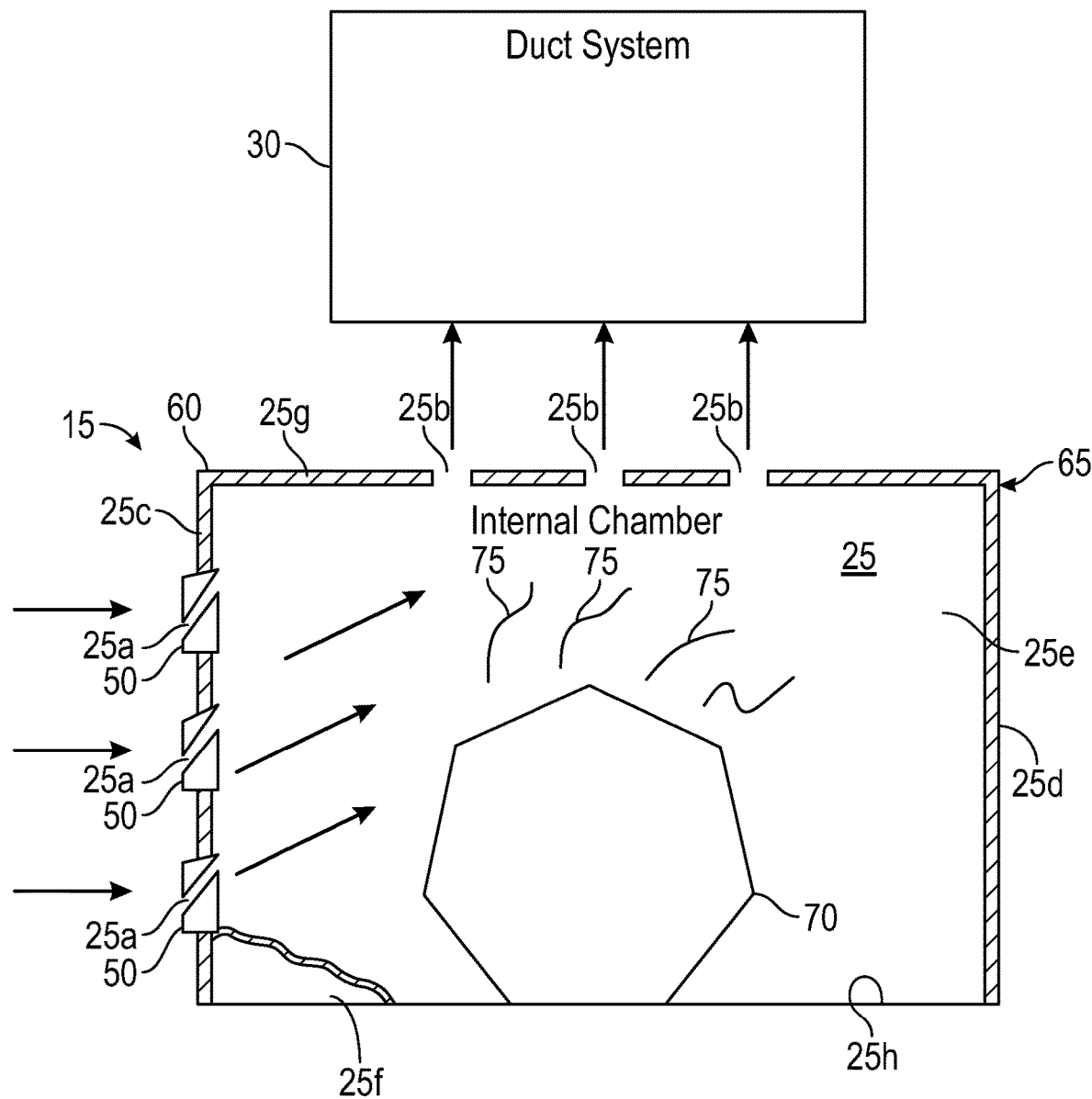
FIG. 3 is a diagrammatic illustration of the containment system and the duct system of FIG. 1, according to another example embodiment.

In an example embodiment, as illustrated in FIG. 2, the internal chamber 25 is formed or defined by wall(s) 25c, 25d, 25e, and 25f, which form a bay, and a roof 25g. In some embodiments, the chamber inlet(s) 25*a* are formed in the wall 25*c* to allow air to enter from outside of the containment system 15 and into the internal chamber 25 of the containment system 15. As such, the chamber inlet(s) 25*a* place the internal chamber 25 in fluid communication with an external environment, or an environment that is external to the containment system 15. In some embodiments, the chamber inlet(s) 25*a* are louvers 50 that are formed in or attached to the wall 25*c*. In some embodiments, the louvers 50 are in a fixed open position. In some embodiments, the chamber outlet(s) 25*b* are formed in the wall 25*d*. In some embodiments, the chamber outlet(s) 25*b* are dampers 55 that are formed in or attached to the wall 25*d*. However, and as illustrated in FIG. 3, the chamber outlet(s) 25*b* may be formed in the roof 25*g* instead of the wall 25*d*. In some embodiments and when the chamber outlet(s) 25*b* are formed in the wall 25*d*, the chamber inlet(s) 25*a* are positioned in or near one side 60 of the internal chamber 25 and the outlet(s) 25*b* are positioned in or near an opposing side 65 of the internal chamber 25. The internal chamber 25 is also defined by a floor 25*h*, which may be earth, ground, slab, or other type of flooring (e.g., temporary, permanent, man-made, natural). In some embodiments, the containment system 15 is sized such that the internal chamber 25 is capable of accommodating scrap material 70 such as a windmill hub, which may exceed 18 tons and define an outermost dimension of anywhere between 7 ft. and 12 ft. When torching activities are performed on the scrap material 70, emissions 75 that are released (both via the torching operation itself and the exposure of high heat to the scrap material 70), enter an air flow, which flows towards the duct system 30. The air flow generally starts at the chamber inlet(s) 25*a* and flows towards the chamber outlet(s) 25*b* and the duct system 30. In some embodiments, the scrap material 70 is positioned between the chamber inlet(s) 25*a* and the duct system 30 to encourage the emissions to enter the air flow towards the duct system 30. In some embodiments, the chamber inlet(s) 25*a* are positioned near the floor 25*h* to encourage the air flow to pass over and/or around the scrap material 70 when traveling toward the duct system 30.

Figure 4:
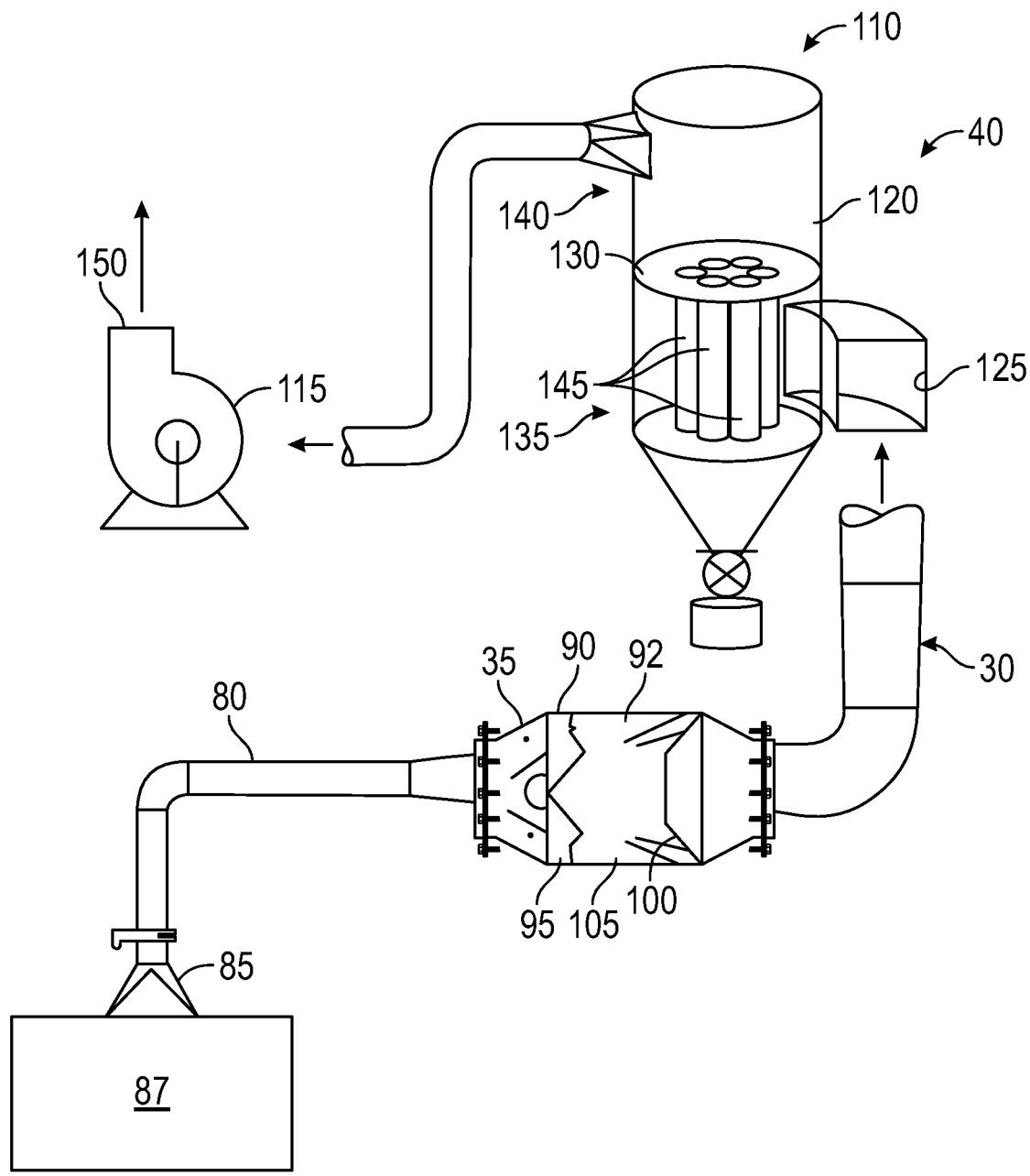
FIG. 4 is a diagrammatic illustration of the duct system, the spark trap, and the filter assembly of FIG. 1, according to an example embodiment.

In an example embodiment and as illustrated in FIG. 4, the duct system 30 includes ductwork 80 and return(s) 85 that extend between the chamber outlet(s) 25*b* and the filter assembly 40. In some embodiments, the duct system 30 fluidically connects the internal chamber 25 with the spark trap 35 via the chamber outlet(s) 25*b*. In some embodiments, as shown in FIG. 4, the duct system 30 includes a common plenum 87, which is in fluid communication with the chamber outlet(s) 25*b*. The spark trap 35 is in fluid communication with the common plenum 87 via the returns 85 and the ductwork 80. However, in some embodiments the common plenum 87 is omitted from the duct system 30.

In some embodiments, the spark trap 35 is in series with the ductwork 80 of the duct system 30 such that the air and emissions passing through the duct system 30 pass through the spark trap 35. Generally, the spark trap 35 inhibits or reduces the likelihood of a metallic piece of material or other piece of material capable of creating a spark from entering the filter assembly 40. That is, the spark trap 35 is a filter or trap to prevent metallic or other spark-generating-prone debris from entering the filter assembly 40. In some embodiments, the spark trap 35 is a Spark Trap by Imperial Systems of Mercer, Pa., USA. In some embodiments, the spark trap 35 includes a housing 90 defining an internal chamber 92 that is positioned in series with the ductwork 80. Impingement blades 95 are positioned within the internal chamber 92 and a screen trap 100 is positioned within the internal chamber 92 at a location downstream from the impingement blades 95. In some embodiments, the screen trap 100 is frusto-conical shaped such that the spark or spark-prone material is prevented from passing through the screen trap 100 and instead falls into a spark collector 105.

In some embodiments, the filter assembly 40 includes a filter 110 and a fan 115. The filter 110 includes a hopper 120 that includes an inlet 125 that is in fluid communication with the duct system 30. In some embodiments, a filter tray 130 divides an intake portion 135 of the hopper 120 with a clean-air return portion 140 of the hopper 120. Filters 145, such as bag filters, extend within the intake portion 135 of the hopper 120, with the air passing into the inlet 125 of the hopper 120 and through the filters 145 to the clean-air return portion 140 of the hopper 120. The clean air, which has passed through the filters 145, exits the filter assembly 40 via an outlet 150. Generally, the fan 115 pulls or moves the air through the chamber inlets(s) 25*a*, the internal chamber 25, the chamber outlet(s) 25*b*, the duct system 30 (including the return(s) 85, and the ductwork 80) including the spark trap 35, and the hopper 120 via the inlet 125 of the hopper 120. As the air and emissions 75 flow through the filter 145 of the hopper 120, the emissions 75 are filtered from the air. In some embodiments, the filter assembly 40 is a CMAXX Dust and Fume Collection System of Imperial Systems of Mercer, Pa., USA. However, in other embodiments, in addition to, or instead of, bag filters, the filter assembly 40 includes a cyclone filter and/or filters other than a bag-based filtering system. In some embodiments, the fan 115 is positioned upstream of the remainder of the filter assembly 40; for example, in some embodiments, the fan 115 is in series with the ductwork 80 of the duct system 30; in other embodiments, the fan 115 is positioned upstream of the chamber inlet(s) 25*a*, pulling in air from the environment and moving the air by pushing the air through the internal chamber 25, the chamber outlet(s) 25*b*, the duct system 30, and the spark trap 35, and into the remainder of the filter assembly 40; in some embodiments, the fan 115 includes a plurality of fans; in some embodiments, the fan 115 is a blower or includes a plurality of blowers.

In some embodiments, the control system 45 is in communication with the filter assembly 40 and controls the operation of the filter assembly 40. In some embodiments, the control system 45 is in communication with the containment system 15 and controls the operation of a portion of the containment system 15.

In some embodiments, the dampers 55 are movable between an open and closed position. In some embodiments, the position of the dampers 55 is controlled via the control system 45. That is, the dampers 55 are moved via the control system 45 and without manual intervention. However, in other embodiments the dampers 55 are manually controlled via a lever or via direct contact with the dampers 55.

Figure 5:
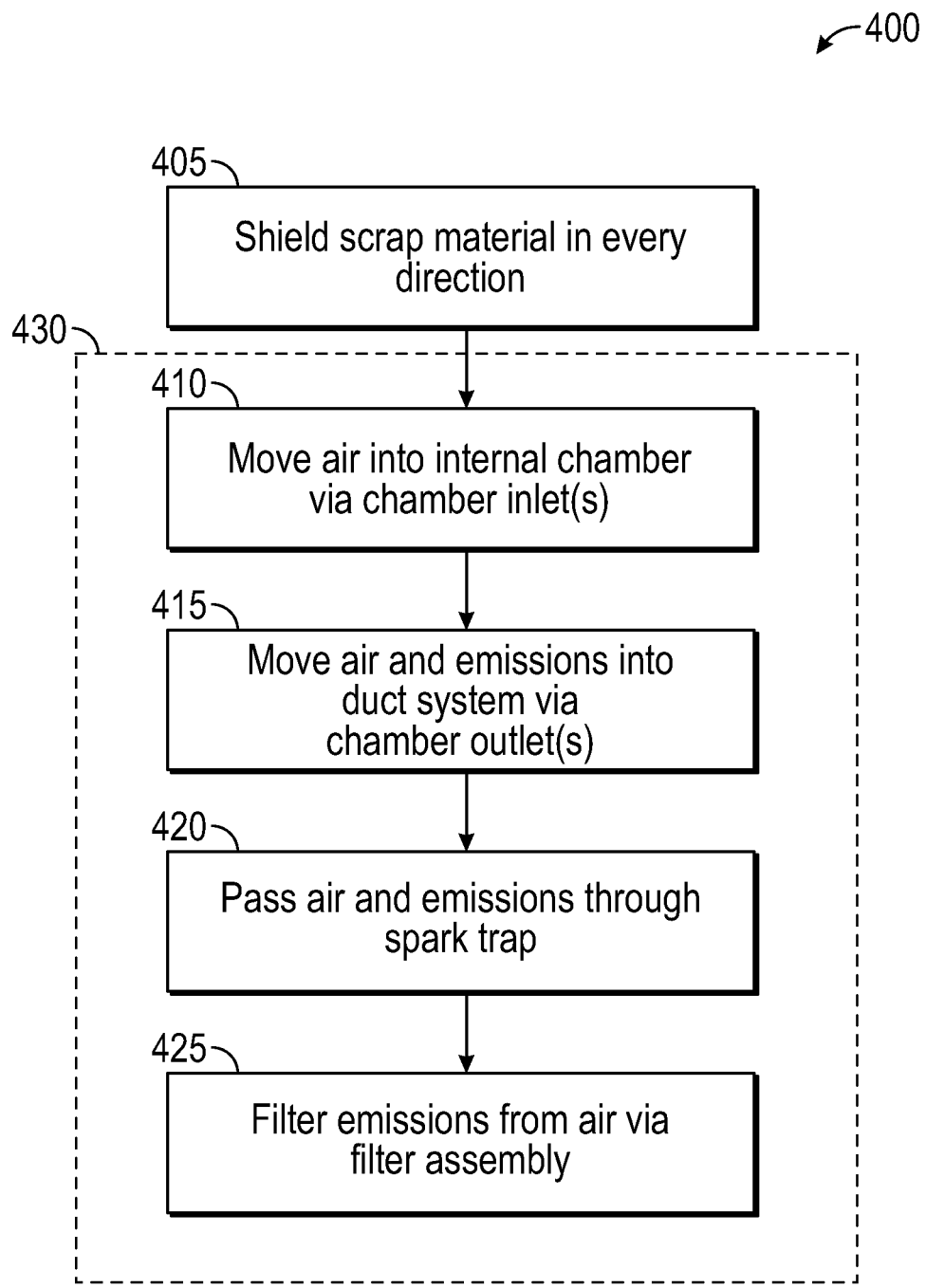
FIG. 5 is a flow chart illustration depicting a method of operating the emissions collection system of FIGS. 1-4, according to an example embodiment.

In an example embodiment, as illustrated in FIG. 5 with continuing reference to FIGS. 1-4, a method 400 of operating the system 10 includes shielding the scrap material 70 in every direction at step 405; moving air into the internal chamber 25 via the chamber inlet(s) 25*a* formed in the wall 25*c* at step 410; moving air and the emissions 75 into the duct system 30 via the chamber outlet(s) 25*b* at step 415; passing the air and the emissions 75 through the spark trap 35 at step 420; and filtering the emissions 75 from the air via the filter assembly 40 at step 425. In some embodiments, the steps 410-425 together form a step 430 of activating the filter assembly 40.

In some embodiments and at step 405, the scrap material 70 is shielded in every direction. Generally, shielding the scrap material 70 in every direction includes positioning the scrap material 70 between the walls 25c, 25d, 25e, and 25f, the roof 25g, and the floor 25h of the internal chamber 25. In some embodiments, the scrap material 70 is positioned in the internal chamber 25 by a crane, forklift, or other overhead equipment. In some embodiments, a door is formed in one of the walls 25c-25f and/or is one of the walls 25c-25f and when the door is closed, the containment system 15 shields the scrap material 70 in every direction when the scrap material 70 is in the internal chamber 25.

In some embodiments and at step 410, air is moved into the internal chamber 25 via the chamber inlet(s) 25a formed in the wall 25c. In some embodiments, the air is moved into the internal chamber 25 from the external environment via the louvers 50. Generally, the air moves from the chamber inlet(s) 25a and over the scrap material 70 and towards the outlet(s) 25b. In some embodiments, the step 410 is performed when the scrap material 70 is shielded in every direction.

In some embodiments and at step 415, the air and the emissions 75 are moved into the duct system 30 via the outlet(s) 25b. In some embodiments and after passing over the scrap material 70, the air moves towards the return(s) 85 of the duct system 30, which align with or are otherwise in fluid communication with the outlet(s) 25b. In some embodiments, the air is moved into the outlet(s) 25b or duct return(s) 85 when the fan 115 is being operated such that the fan 115 draws or moves the air into the duct system 30 from the internal chamber 25. In some embodiments and when the duct system 30 includes the plenum 87 and the outlet(s) 25b are formed in the wall 25d (example shown in FIG. 2), the fan 115 draws the air and the emissions 75 into the common plenum 87 via the chamber outlet(s) 25b, into the ductwork 80 via the return(s) 85, and into the spark trap 35 via the ductwork 80. In some embodiments and when the plenum 87 is omitted from the duct system 30 and the outlet(s) 25b are formed in the roof 25g (example shown in FIG. 3), the fan 115 draws the air and the emissions 75 into the return 85 via the chamber outlet(s) 25b, into the ductwork 80 via the return(s) 85, and into the spark trap 35 via the ductwork 80.

In some embodiments and at step 420, the air and the emissions 75 are passed through the spark trap 35. When the air and the emissions 75 are passed through the spark trap 35, metallic pieces of material or sparks pass through the impingement blades 95, deflect off the screen trap 100 towards the housing 90, and collect in the spark collector 105.

In some embodiments and at step 425, the emissions 75 are filtered from the air via the filter assembly 40. Generally, the air and the emissions 75 enter the intake portion 135 of the hopper 120 via the inlet 125. The air passes through the filters 145 but the emissions 75 are contained on or in the filters 145. The cleaned air passes through the clean-air return portion 140 of the hopper 120 and through the fan 115 before exiting the filter assembly 40 via the outlet 150.

In some embodiments, the step 420 is omitted from the step 430. However, in other embodiments any one or more of the steps 410, 415, 420, and 425 are omitted from the step 430.

In some embodiments, the use of the system 10 and/or completion of at least a portion of the method 400 allows for the collection of the emissions 75 produced during the scrapping of the scrap material 70.

Figure 6:
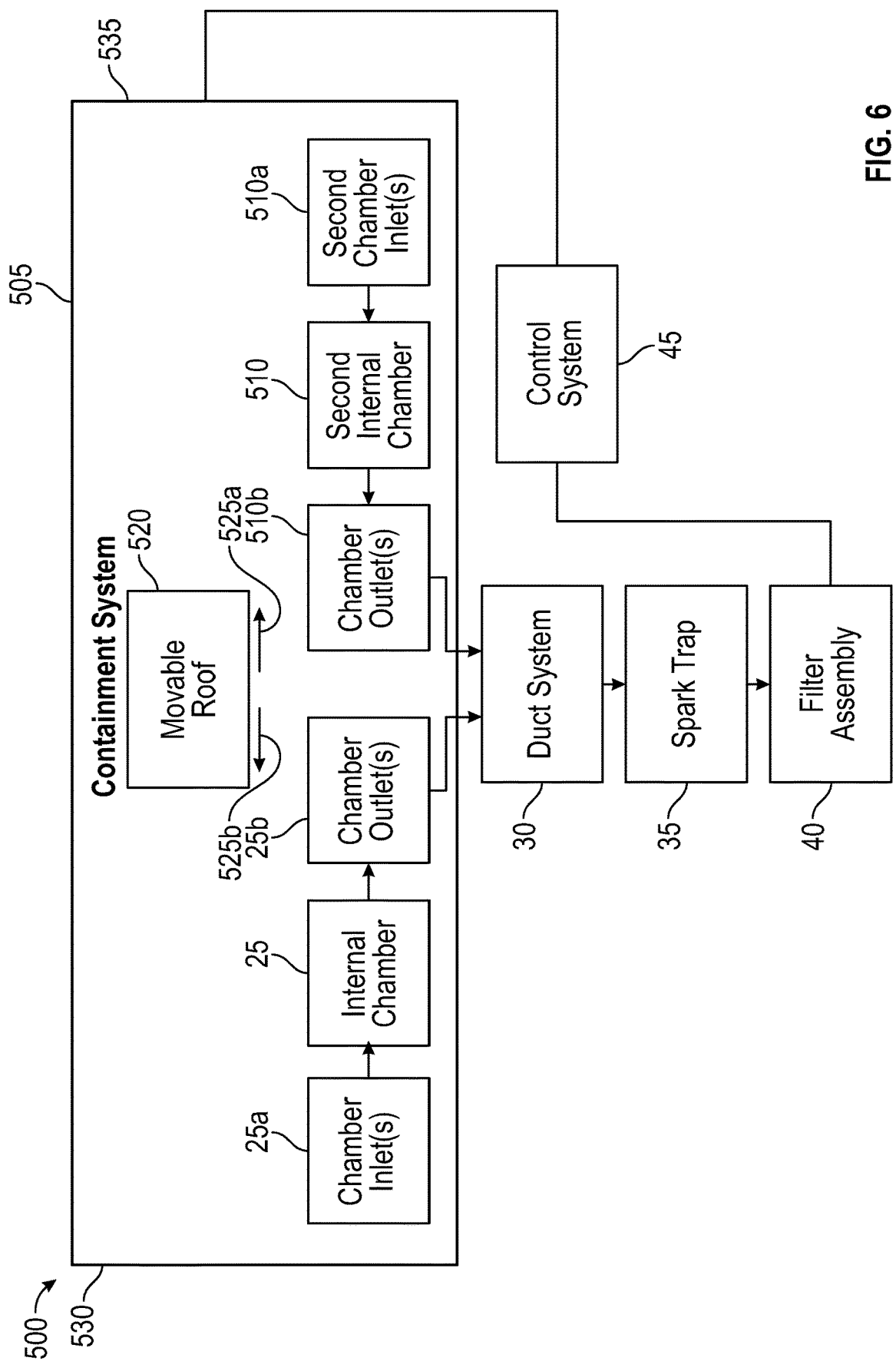
FIG. 6 is a diagrammatic illustration of an emissions collection system, according to another example embodiment.

Another example embodiment of an emissions collection system 10 is illustrated in FIG. 6 and is generally referred to by the reference numeral 500. The emissions collection system 500 includes a containment system 505 that includes the chamber inlet(s) 25a, the internal chamber 25, and the chamber outlet(s) 25b and also includes a second internal chamber 510, second chamber inlet(s) 510a, and second chamber outlet(s) 510b. The containment system 505 also includes a movable roof 520, which is an embodiment of the roof 25g, and which moves in a direction indicated by arrow 525a in FIG. 6 and an opposing direction indicated by arrow 525b in FIG. 6. The movable roof 520 moves relative to each of the chamber inlet(s) 25a, the internal chamber 25, the chamber outlet(s) 25b, the second chamber inlet(s) 510a, the second internal chamber 510, the second chamber outlet(s) 510b. In some embodiments, the system 500 includes the duct system 30 that places the containment system 505 in fluid communication with the spark trap 35 and the filter assembly 40. The system 500 also includes the control system 45 that is in communication with the filter assembly 40 and at least a portion of the containment system 505, such as the movable roof 520.

Generally, the second internal chamber 510 is identical or substantially similar to the internal chamber 25 and therefore reference numerals used to refer to the features of the internal chamber 25 that are substantially identical to the features of the second internal chamber 510 will correspond to the reference numerals used to refer to the features of the internal chamber 25 except that the prefix for the reference numerals used to refer to the features of the internal chamber 25, that is, 25, will be replaced by the prefix of the second internal chamber, that is, 510. The duct system 30 is in fluid communication with the outlets 510b of the second internal chamber 510.

In some embodiments, the containment system 505 has a first end 530 and an opposing second end 535 and the chamber inlet(s) 25a are positioned on or near the first end 530 and the second chamber inlet(s) 510a are positioned on or near the second end 535. In some embodiments, the plenum 87 of the duct system 30 extends between the wall 25d and a wall in which the chamber outlet(s) 510b are formed so the plenum 87 is in fluid communication with each of the outlet(s) 25b and 510b and is shared by the internal chambers 25 and 510.

In some embodiments, the movable roof 520 is movable relative to each of the internal chambers 25 and 510. Generally, the movable roof 520 is sized to cover the footprint of one of the two internal chambers 25 and 510. That is, when the movable roof 520 is positioned over a first bay that is defined at least by the walls 25c-25f, it simultaneously uncovers a second bay that is defined at least by the walls forming the internal chamber 510. In some embodiments, the movable roof 520 includes tracks that extend over both of the chambers 25 and 510; a cover portion; wheels or other movers attached to the cover portion to move the cover portion along and relative to the tracks; and a driver system that initiates the movement of the cover portion relative to the tracks. Generally, the cover portion of the movable roof is moved over the first bay or the second bay in order to form the first internal chamber 25 or form the second internal chamber 510 and thus shield any scrap material 70 that is positioned in the internal chamber 25 or 510. In some embodiments, a cover is positioned between the driver and the internal chamber 25 or 510 to protect the driver from sparks or other debris.

Figure 7:
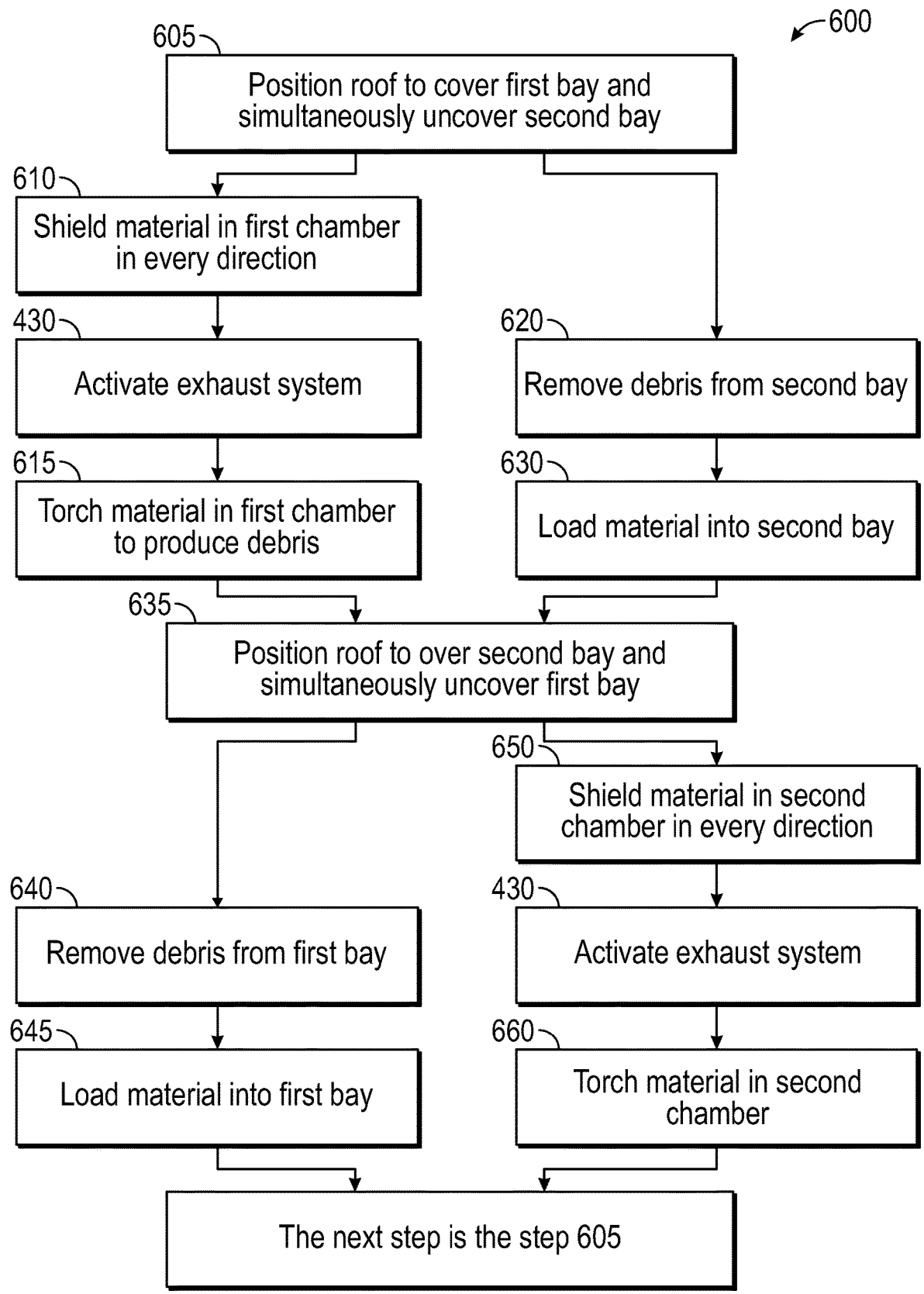
FIG. 7 is a flow chart illustration depicting a method of operating the emissions collection system of FIG. 6, according to an example embodiment.

In an example embodiment, as illustrated in FIG. 7 with continuing reference to FIGS. 1-6, a method 600 of operating the system 500 includes positioning the movable roof 520 to cover the first bay and simultaneously uncover the second bay at step 605; shielding the scrap material 70 in the first internal chamber 25 in every direction at step 610;

activating the exhaust system at the step 430; and torching the scrap material 70 in the first internal chamber 25 to produce debris at step 615. The method 600 also includes removing debris from the second bay at step 620 and loading the scrap material 70 in the second bay at step 630. After the steps 615 and/or the step 630, the method 600 also includes positioning the movable roof 520 to cover the second bay and simultaneously uncover the first bay at step 635; removing debris from the first bay at step 640 and loading the scrap material 70 into the first bay at step 645. The method 600 also includes shielding the scrap material 70 in the second internal chamber 510 in every direction at step 650; activating the exhaust system at the step 430; and then torching the scrap material 70 in the second internal chamber 510 at step 660. After the steps 645 and/or the step 660, the next step is the step 605. Generally, any one or more of the steps 610, 430, and 615 occurs simultaneously with any one or more of the steps 620 and 630. Similarly, any one or more of the steps 640 and 645 occurs simultaneously with any one or more of the steps 650, 430, and 660.

In an example embodiment and at the step 605, the movable roof 520 is positioned to cover the first bay and simultaneously uncover the second bay. Generally, the control system 45 controls the movement of the roof 520 to move in the direction 525b.

In an example embodiment and at the step 610, the scrap material 70 is shielded in every direction. In some embodiments, doors are formed in any one of the walls 25c, 25e, or 25f or at least attached to one of the walls 25c, 25e, or 25f such that shielding the scrap material 70 in every direction includes closing the doors.

In an example embodiment and at the step 430, the filter assembly 40 is activated to move air through the first internal chamber 25.

In an example embodiment and at the step 615, the scrap material 70 is torched in the first internal chamber 25 to produce debris and emissions 75. However, in other embodiments, the scrap material 70 can be divided or disassembled to produce debris in ways or methods other than torching. When the scrap material 70 is torched in the first internal chamber 25 after the filter assembly 40 is activated, the emissions 75 from the torching are initially contained within the first internal chamber 25 and then removed from the air via the filter assembly 40 as illustrated in the method 400.

In an example embodiment and at the step 620, debris is removed from the second bay. In some embodiments, the debris is located in the second bay—prior to removal—due to scrap material 70 being torched in the second internal chamber 510. In some embodiments, the step 620 includes opening the doors and the debris is removed via a crane that accesses the debris via the second bay when the roof portion is positioned over the first bay. However, other types of equipment can be used to remove debris from the second bay.

In an example embodiment and at the step 630, the scrap material 70 is loaded into the second bay. After the debris is removed from the second bay, additional scrap material 70 is positioned into the second bay. Similar to the removal of the debris, a crane or other equipment can be used to load the scrap material 70 (due to the second bay not being covered by the movable roof 520 and/or due to the doors being open).

In an example embodiment and at the step 635, the movable roof 520 is positioned over the second bay to cover the second bay and create the second internal chamber 510 and simultaneously uncover the first bay. Generally, the step 635 is substantially similar to the step 605 except that the movable roof 520 moves in the direction 525a to cover the second bay, instead of the direction 525b to cover the first bay.

In an example embodiment and at the step 640, the debris is removed from the first bay. Generally, the step 640 is substantially similar to the step 620 except that the debris is being removed from the first bay instead of the second bay.

In an example embodiment and at the step 645, additional scrap material 70 is loaded into the first bay. Generally, the step 645 is substantially similar to the step 630 except that additional scrap material 70 is being loaded into the first bay instead of the second bay.

In an example embodiment and at the step 650, the scrap material 70 in the second internal chamber 510 is shielded in every direction. Generally, the step 650 is substantially similar to the step 610 except that scrap material 70 is in the second internal chamber 510 instead of the internal chamber 25.

In an example embodiment and at the step 430, the filter assembly 40 is activated to move air through and from the second internal chamber 510.

In an example embodiment and at the step 660, the scrap material 70 in the second internal chamber 510 is torched. Generally, the step 660 is substantially similar to the step 615 except that scrap material 70 is in the second internal chamber 510 instead of the internal chamber 25.

After the step 645 and/or the step 660, the next step is the step 605 such that the method 600 repeats.

In some embodiments, the use of the system 500 and/or completion of at least a portion of the method 600 allows for a double-bay configuration containment system 505 in which when one bay is being loaded/unloaded, the other bay is being used for scrapping. As a result, the filter assembly 40 and at least a portion of the duct system 30 are shared by the double-bay configuration containment system 505 and are used more efficiently (more continuous use instead of pausing for the load/unloading of scrap material in one bay). The movable roof 520 opening to expose the first bay allows for an overhead piece of equipment to easily load/unload the scrap material 70 and/or the debris from the first bay while scrap material 70 is being scrapped in the second internal chamber 510 (i.e., the second bay when the movable roof 520 extends over the second bay).

Figure 8:
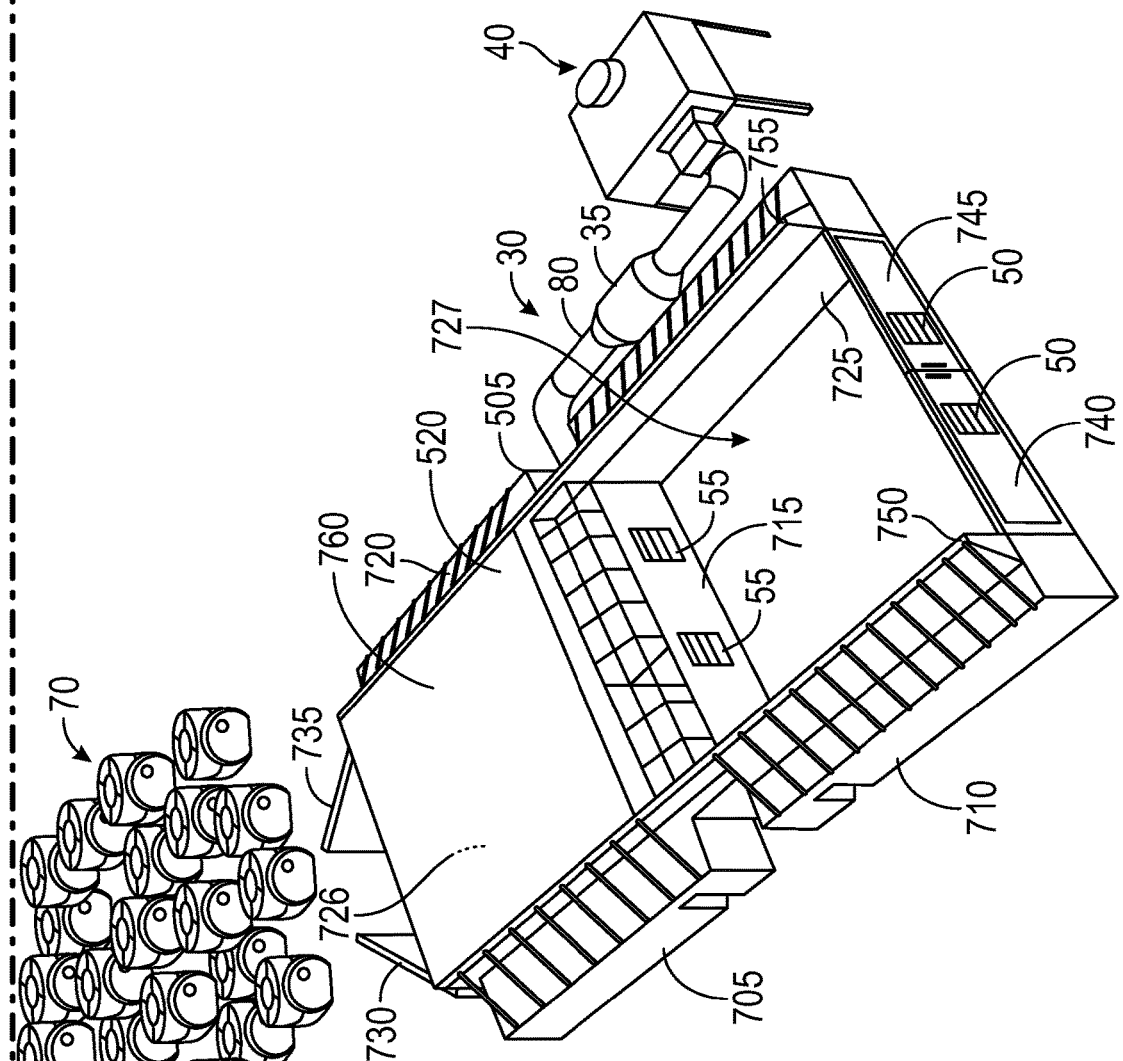
FIG. 8 is a perspective view of the emissions collection system of FIG. 6, according to an example embodiment.

Another example embodiment of the emissions collection system 500 is illustrated in FIG. 8 and is generally referred to by the reference numeral 700. Generally, the emissions collection system 700 includes the components of the emissions collection system 500. In some embodiments, the containment system 505 is formed from a plurality of shipping containers 705, 710, 715, 720, and 725, that are positioned in a generally "H" shape. As such, the shipping container 715 forms a portion of both a first bay 726 and a second bay 727. Shipping containers 705 and 720 are positioned generally perpendicular to shipping container 715 such that the first bay 726 is formed at least partially by the containers 705, 715, and 720. One of doors 730 and 735 is attached to one of the containers 705 and 720 and closable to help shield the scrap material 70 positioned in the first bay and openable to aid in the removal of debris after the scrap material 70 is cut into smaller pieces, or debris. A similar arrangement with the shipping containers 710, 715, and 725 is provided to form the second bay 727. Doors 740 and 745 form the second bay 727. Louvers 50 are formed in each of the doors 730 and 735 of the first bay 726 to provide the chamber inlet(s) 25a for the chamber 25 and in each of the doors 740 and 745 of the second bay 727 to provide the second chamber inlet(s) 510a for the chamber 510. In some embodiments, the outlet(s) 25*b* and 510*b* are formed via the dampers 55 in walls of the shipping container 715. In some embodiments, the shipping container 715 forms the common plenum 87, which is positioned between the first bay 726 and the second bay 727.

In some embodiments, the shipping container 715 forms a passage and functions as one of the return(s) 85 to the duct system 30 that receives the air moved through the first internal chamber 25 formed by the first bay 726 and the second internal chamber 510 formed by the second bay 727. In some embodiments, the dampers 55 that are coupled to the shipping container 715 are closed and opened manually. However, in other embodiments, the dampers 55 are automatically closed or at least closed via a mechanical driver or motor. That is, when the filter assembly 40 is configured to pull/move air from the internal chamber 25 formed by the first bay 726, the dampers 55 that separate the duct system 30 from the second internal chamber 510 or the second bay 727 are closed and when the filter assembly 40 is configured to pull air from the internal chamber 510, the dampers 55 that separate the duct system 30 from the first internal chamber 25 or the first bay 726 are closed. Ductwork 80 also extends from the shipping container 715 and to an inlet of the spark trap 35, which is positioned near the shipping container 725. The ductwork 80 then extends from an outlet of the spark trap 35 and to the filter assembly 40, which is also positioned near the shipping container 725.

As illustrated in FIG. 8, the movable roof system includes tracks 750 and 755 that extend along the length of the H shape formed by the shipping containers 705-725. In some embodiments, the tracks are crane rail. As the tracks 750 and 755 are stationary relative to the shipping containers 705-725, a cover portion 760 moves relative to the shipping containers 705-725 that define the first bay 726 and the second bay 727. In some embodiments, the driver of the movable roof 520 is attached to the covered portion 760 and moves relative to the tracks 750 and 755 when the cover portion 760 is moved. However, in other embodiments, the driver of the movable roof 520 is stationary relative to the tracks 750 and 755. In some embodiments, the operation of the driver of the movable roof 520 is via a remote. In some embodiments, the driver of the movable roof 520 is in communication with the control system 45 and the control system 45 controls the movement of the movable roof 520.

In some embodiments, the control system 45 is housed within a passage formed by one of the shipping containers 705-725.

Figure 9:
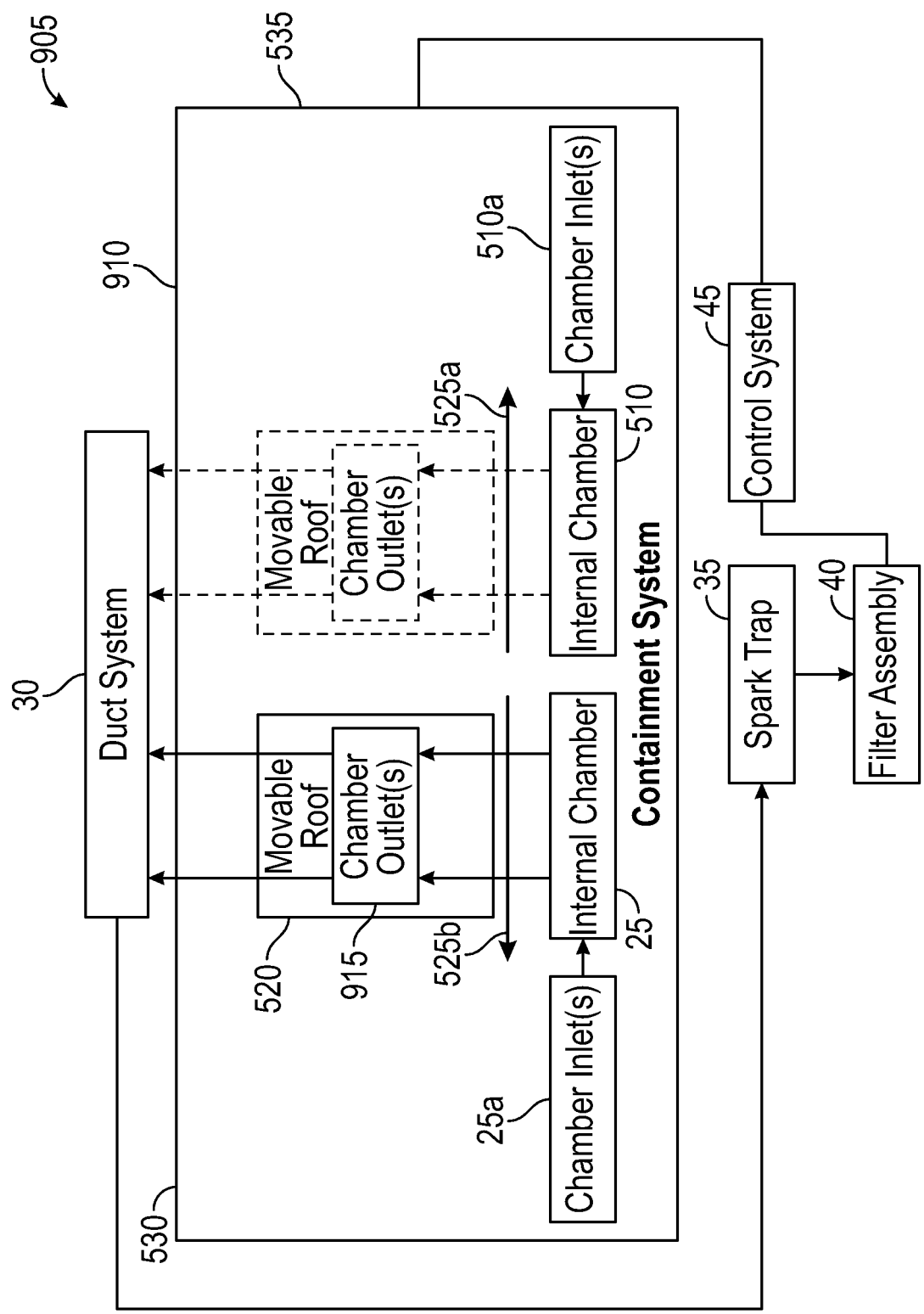
FIG. 9 is a diagrammatic illustration of an emissions collection system, according to another example embodiment.

Another example embodiment of an emissions collection system 500 is illustrated in FIG. 9 and is generally referred to by the reference numeral 905. The emissions collection system 905 is similar to the emissions collection system 500 except that the system 905 includes a containment system 910 instead of the containment system 505. The containment system 910 is identical to the containment system 505 except that the plenum 87 and the chamber outlet(s) 25*b* and 510*b* are omitted from the system 910. Instead, in the containment system 910, chamber outlet(s) 915 are formed in the movable roof 520. As such, the chamber outlet(s) 915 are chamber outlet(s) for the internal chamber 25 when the movable roof has been moved in the direction 525*b* to cover the first bay and are chamber outlet(s) for the internal chamber 510 when the movable roof has been moved in the direction 525*a* to cover the second bay. The duct system 30 is in fluid communication with the outlets 915. As such, the duct system 30 is in fluid communication with the internal chamber 25 when the movable roof has been moved in the direction 525*b* to cover the first bay and is in fluid communication with the internal chamber 510 when the movable roof has been moved in the direction 525*a* to cover the second bay.

A method of operating the system 905 is identical to the method 600. However, with the system 905 and at the step 605, positioning the movable roof 520 over the second bay places the chamber outlet(s) 915 of the movable roof in fluid communication with the second bay and the internal chamber 510. Moreover, with the system 905 at the step 635, positioning the movable roof 520 over the first bay places the chamber outlet(s) 915 of the movable roof in fluid communication with the first bay and the internal chamber 25. In some embodiments, the use of the system 910 and/or completion of at least a portion of the method 600 using the system 910 allows for the double-bay configuration containment system 505 in which when one bay is being loaded/unloaded, the other bay is being used for scrapping. As a result, the filter assembly 40 and at least a portion of the duct system 30 are shared by the double-bay configuration containment system 505 and are used more efficiently (more continuous use instead of pausing for the load/unloading of scrap material in one bay). The movable roof 520 opening to expose the first bay allows for an overhead piece of equipment to easily load/unload the scrap material 70 and/or the debris from the first bay while scrap material 70 is being scrapped in the second internal chamber 510 (i.e., the second bay when the movable roof 520 extends over the second bay).

Figure 10:
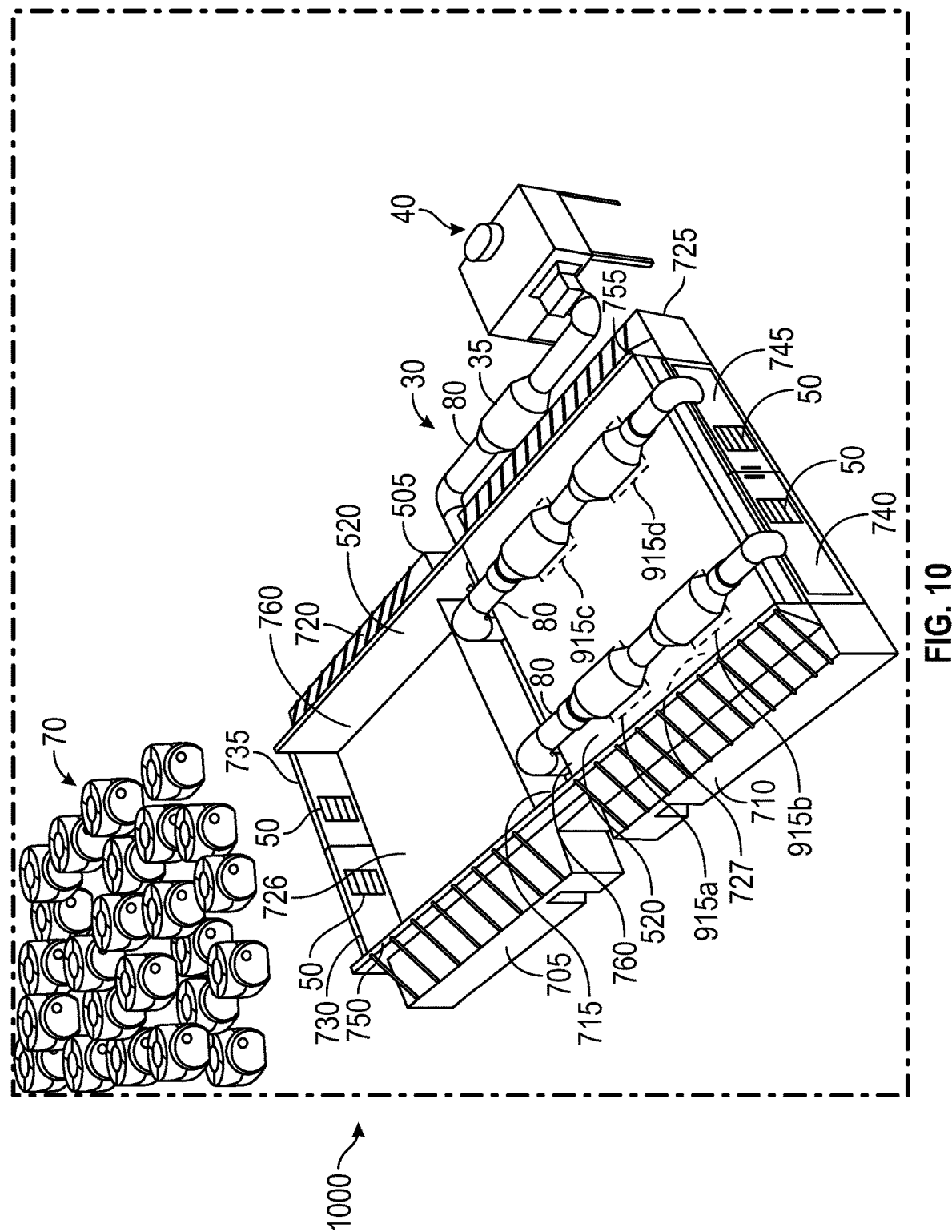
FIG. 10 is a perspective view of the emissions collection system of FIG. 9, according to an example embodiment.

An example embodiment of the emissions collection system 905 is illustrated in FIG. 10 and is generally referred to by the reference numeral 1000. The system 1000 includes some of the same components of the system 700 and is formed by the plurality of shipping containers 705, 710, 715, 720, and 725, that are positioned in a generally "H" shape. As such, the shipping container 715 forms a portion of both the first bay 726 and a second bay 727. Shipping containers 705 and 720 are positioned generally perpendicular to shipping container 715 such that the first bay 726 is formed at least partially by the containers 705, 715, and 720. One of doors 730 and 735 is attached to one of the containers 705 and 720 and closable to help shield the scrap material 70 positioned in the first bay and openable to aid in the removal of debris after the scrap material 70 is cut into smaller pieces, or debris. A similar arrangement with the shipping containers 710, 715, and 725 is provided to form the second bay 727. Doors 740 and 745 form the second bay 727. Louvers 50 are formed in each of the doors 730 and 735 of the first bay 726 to provide the chamber inlet(s) 25*a* for the chamber 25 and in each of the doors 740 and 745 of the second bay 727 to provide the second chamber inlet(s) 510*a* for the chamber 510. The movable roof system includes the tracks 750 and 755 that extend along the length of the H shape formed by the shipping containers 705-725. As the tracks 750 and 755 are stationary relative to the shipping containers 705-725, the cover portion 760 moves relative to the shipping containers 705-725 that define the first bay 726 and the second bay 727. As illustrated in FIG. 10, the cover portion 760 of the system 1000 is positioned over the second bay 727. The cover portion 760 includes the outlet(s) 915, such as outlet 915*a*, 915*b*, 915*c*, and 915*d*. As illustrated, outlets 915*a*, 915*b*, 915*c*, and 915*d* are formed through the movable cover portion 760 and are in fluid communication with ductwork 80 that is coupled to the movable cover portion 760. In some embodiments, the chamber outlet(s) 915, such as 915*a*, 915*b*, 915*c*, and 915*d* includes or is formed by a hood, which is placed in fluid communication with the ductwork 80.

Figure 11:
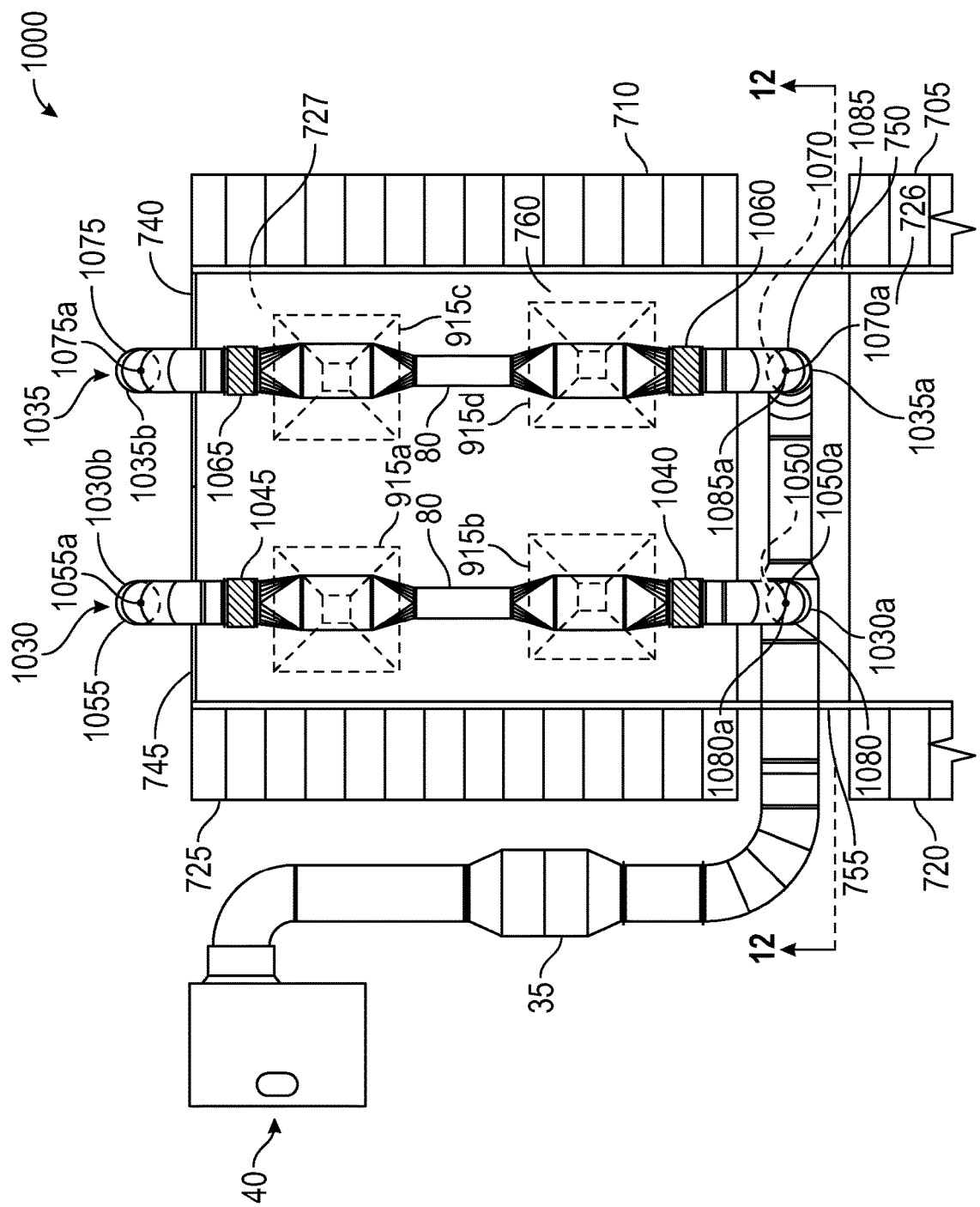
FIG. 11 is a top view of a portion of the emissions collection system of FIG. 10, according to an example embodiment.

FIG. 11 is a top plan view of a portion of the system 1000. As illustrated, the ductwork 80 extends across the movable cover portion 760 to form a first ductwork portion 1030 and a second, separate ductwork portion 1035. The first ductwork portion 1030 has a first end 1030a and a second opposing end 1030b. In some embodiments, a length of the first ductwork portion 1030 that is defined between the first and second ends 1030a, 1030b, is greater than a length of the movable roof portion 760. As such, the first and second ends 1030a, 1030b extend beyond edges of the movable roof portion 760. Generally, the first portion 1030 extends across the movable cover portion 760 and places the outlets 915b and 915a in fluid communication. A damper 1040 is positioned between the first end 1030a and the outlet 915b to fluidically isolate the outlets 915b and 915a from the first end 1030a when the damper 1040 is in a closed position and to place the outlets 915b and 915a in fluid communication with the first end 1030a when the damper 1040 is in an open position. Similarly, a damper 1045 is positioned between the second end 1030b and the outlet 915a to fluidically isolate the outlets 915b and 915a from the second end 1030b when the damper 1045 is in a closed position and to place the outlets 915b and 915a in fluid communication with the second end 1030b when the damper 1045 is in an open position. The ends 1030a and 1030b are associated with 90-degree elbows and form openings 1050 and 1055, respectively. The openings 1050 and 1055 have longitudinal axes 1050a and 1055a, respectively. The second ductwork portion 1035 is identical or at least substantially similar to the first ductwork portion 1030 but is spaced from the first ductwork portion 1030. The second ductwork portion 1035 has a first end 1035a and a second opposing end 1035b. Similar to the first ductwork portion 1030, a length of the second ductwork portion 1035 that is defined between the first and second ends 1035a and 1035b, is greater than a length of the movable roof portion 760. As such, the first and second ends 1035a and 1035b extend beyond edges of the movable roof portion 760. Generally, the second portion 1035 extends across the movable cover portion 760 and places the outlets 915c and 915d in fluid communication. A damper 1060 is positioned between the first end 1035a and the outlet 915d to fluidically isolate the outlets 915c and 915d from the first end 1035a when the damper 1060 is in a closed position and to place the outlets 915c and 915d in fluid communication with the first end 1035a when the damper 1060 is in an open position. Similarly, a damper 1065 is positioned between the second end 1035b and the outlet 915c to fluidically isolate the outlets 915c and 915d from the second end 1035b when the damper 1065 is in a closed position and to place the outlets 915c and 915d in fluid communication with the second end 1035b when the damper 1065 is in an open position. The ends 1035a and 1035b are associated with 90-degree elbows and form openings 1070 and 1075, respectively.

Figure 12:
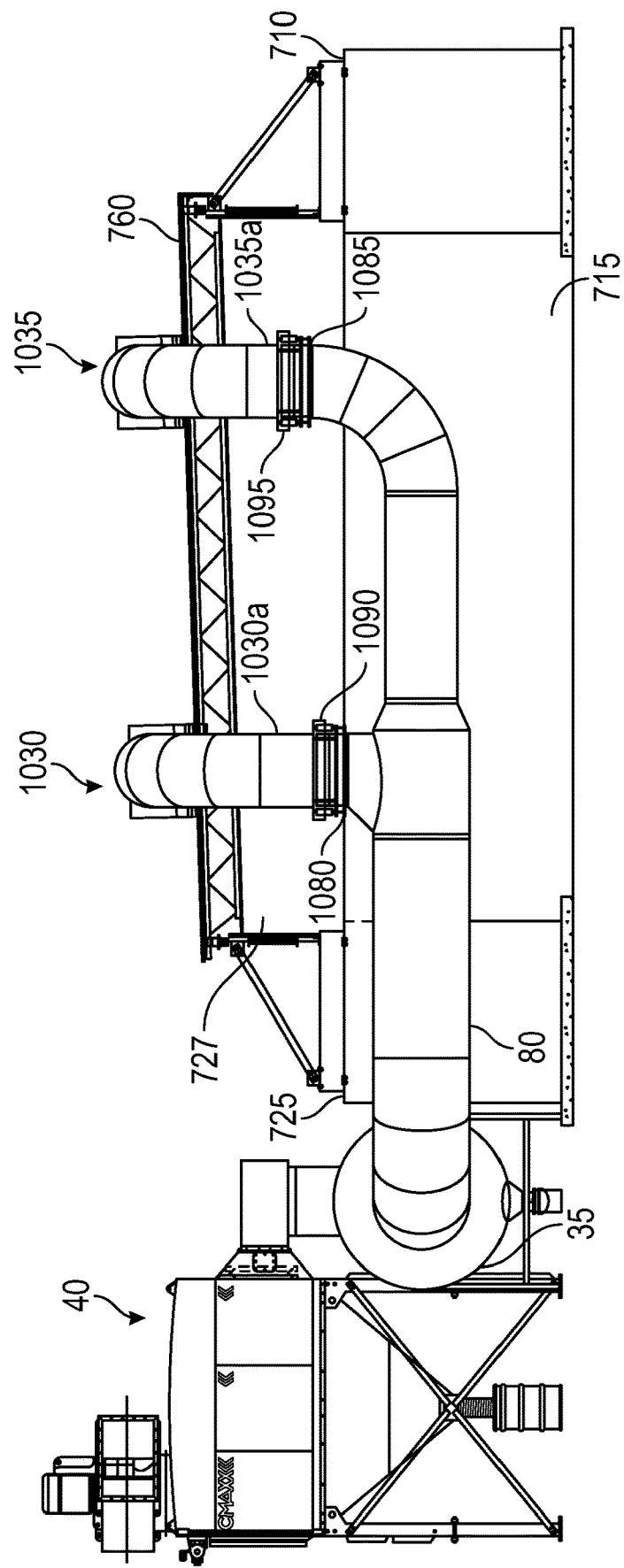
FIG. 12 is a sectional view of the emissions collection system of FIG. 11 taken along line 12-12, according to an example embodiment.

As illustrated in FIG. 12, the ductwork 80 that extends within the passage formed within the shipping container 715 includes returns 1080 and 1085, which are each a return 85 of the duct system 30. In some embodiments, each return 1080 and 1085 has a longitudinal axis 1080a and 1085a (shown in FIG. 11), respectively. In some embodiments, couplers 1090 and 1095 are associated with the returns 1080 and 1085, respectively. In some embodiments, the return 1080 is associated with the first ductwork portion 1030 and is configured to couple, via the coupler 1090, to either the opening 1050 or the opening 1055. In some embodiments, the return 1085 is associated with the second ductwork portion 1035 and is configured to couple, via the coupler 1095, to either the opening 1070 or the opening 1075. In some embodiments, the couplers 1090 and 1095 may include compressed air actuators. In some embodiments, the height of the couplers 1090 and 1095 are the same, but in other embodiments the couplers 1090 and 1095 have different heights. Generally, the dampers 1040, 1045, 1060, and 1065 are configured to be actuated remotely.

When the system 1000 is used in the method 600, at the step 605 the movable roof portion 760 is positioned to cover the first bay 726 to create the first internal chamber 25 and simultaneously uncover the second bay 727. The step 605 also includes aligning the longitudinal axis 1055a of the opening 1055 with the longitudinal axis 1080a of the return 1080 and coupling the opening 1055 to the return 1080 via the coupler 1090. The step 605 may also include aligning the longitudinal axis 1075a of the opening 1075 with the longitudinal axis 1085a of the return 1085 and coupling the opening 1075 to the return 1085 via the coupler 1090. Moreover, the step 605 may include closing the dampers 1040 and 1060 to fluidically isolate the outlets 915a, 915b, 915c, and 915d from the openings 1050 and 1070 such that air is drawing from the first bay 726 via the outlets 915a, 915b, 915c, and 915d.

At the step 635, the movable roof 520 is positioned over the second bay 727 to cover the second bay 727 and create the second internal chamber 510 and simultaneously uncover the first bay 726. The step 635 includes aligning the longitudinal axis 1050a of the opening 1050 with the longitudinal axis 1080a of the return 1080 and coupling the opening 1050 to the return 1080 via the coupler 1090. The step 635 may also include aligning the longitudinal axis 1070a of the opening 1070 with the longitudinal axis 1085a of the return 1085 and coupling the opening 1070 to the return 1085 via the coupler 1095. Moreover, the step 635 may include closing the dampers 1045 and 1065 to fluidically isolate the outlets 915a, 915b, 915c, and 915d from the openings 1055 and 1075 such that air is drawing from the first bay 726 via the outlets 915a, 915b, 915c, and 915d.

In some embodiments, the use of the system 1000 and/or completion of at least a portion of the method 600 using the system 1000 allows for the double-bay configuration containment system 505 in which when one bay is being loaded/unloaded, the other bay is being used for scrapping. As a result, the filter assembly 40 and at least a portion of the duct system 30 are shared by the double-bay configuration containment system 505 and are used more efficiently (more continuous use instead of pausing for the load/unloading of scrap material in one bay). The movable roof 520 opening to expose the first bay allows for an overhead piece of equipment to easily load/unload the scrap material 70 and/or the debris from the first bay while scrap material 70 is being scrapped in the second internal chamber 510 (i.e., the second bay when the movable roof 520 extends over the second bay).

Figure 13A:
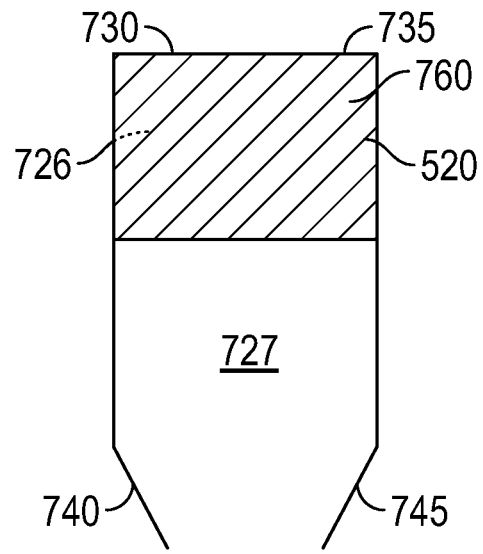
FIG. 13A is a diagrammatic illustration of the emissions collection system of FIG. 6 or FIG. 9 in a first configuration, according to an example embodiment.
Figure 13B:
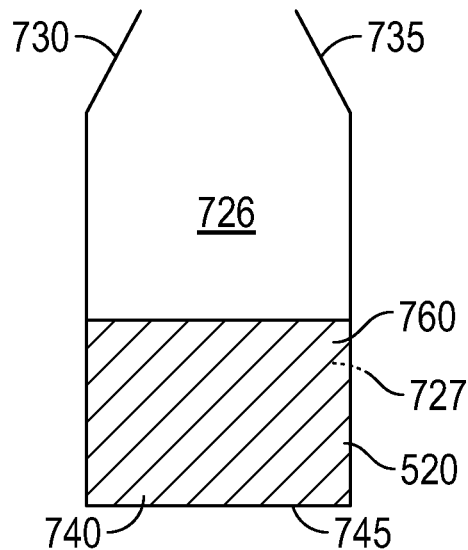
FIG. 13B is a diagrammatic illustration of the emissions collection system of 13A in a second configuration, according to an example embodiment.

FIG. 13A is a diagrammatic view of the system 700 or the system 1000 when the movable roof 520 is in a first configuration, in which the first bay 726 is covered by the cover portion 760, the doors 730 and 735 are closed, the second bay 727 is exposed, and the doors 740 and 745 are open. FIG. 13B is a diagrammatic view of the system 700 or the system 1000 when the movable roof 520 is in a second configuration, in which the first bay 726 is exposed, the doors 730 and 735 are open, the second bay 727 is covered by the cover portion 760, and the doors 740 and 745 are closed.

Figure 14A:
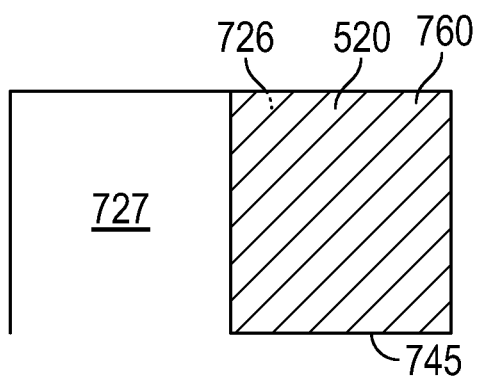
FIG. 14A is a diagrammatic illustration of an alternate embodiment of the emissions collection system of FIG. 6 or FIG. 9 in a first configuration, according to an example embodiment.
Figure 14B:
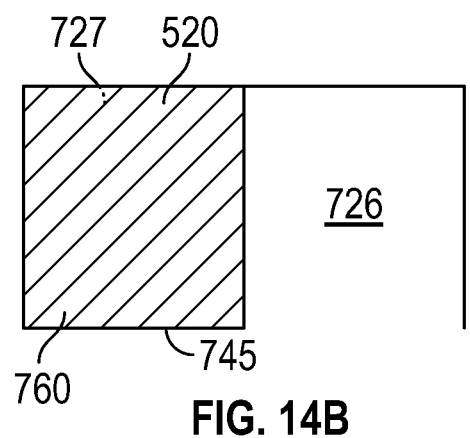
FIG. 14B is a diagrammatic illustration of the alternate embodiment of the emissions collection system of FIG. 14A in a second configuration, according to an example embodiment.

FIGS. 14A and 14B are diagrammatic views of an alternate embodiment of the system 700 or the system 1000 in which the first and second bays 726 and 727 are arranged in parallel. In this alternate embodiment, instead of the bays 726 and 727 being arranged such that the doors 730, 735, 740, and 745 are positioned on opposing ends of the containment system 505 or 910, the doors 730, 735, 740, and 745 are positioned on the same side of the containment system 505 or 910 such that the first and second bays 726 and 727 are arranged in parallel. In some embodiments, at least one of the doors 730, 735, 740, and 745 may be omitted and the remaining doors are shared between bays 726 and 727 such that opening the door of the bay 726 simultaneously closes the door of the bay 727 and vice versa. In some embodiments, the doors 730, 735, and 740 are omitted and the movable roof 520 is coupled to the door 745 such that, when the cover portion 760 of the movable roof 520 moves between a first position and a second position, the door 745 also moves to open or close the bays 726 and 727. FIG. 14A is a diagrammatic view of the alternate embodiment of the system 700 or the system 1000 when the cover portion 760 of the movable roof 520 is in a first configuration, in which the first bay 726 is covered by the cover portion 760, the door 745 "closes" the first bay 726, and the second bay 727 is exposed. FIG. 14B is a diagrammatic view of the alternate embodiment of the system 700 or the system 1000 when the cover portion 760 of the movable roof 520 is in the second configuration, in which the second bay 727 is covered by the cover portion 760, the door 745 "closes" the second bay 727, and the first bay 726 is exposed.

In other embodiments, the ductwork 80 and one return 85 extends within the chambers 25 and/or 510 and are positional relative to the scrap material 70 that is loaded in the chambers 25 and/or 510. That is, in order to better capture emissions 75 generated by the scrap material 70, the ductwork 80 and the return 85 are cantilevered from and rotatable relative to one of the walls 25c-25f and/or the walls that define the second internal chamber 510. In some embodiments, the ductwork 80 and the return 85 are secured to a swing-arm that can be positioned next to a wall when the scrap material 70 is being loaded and the debris is being unloaded, but swung toward and over the scrap material 70 when the scrap material 70 is being torched or when the emissions 75 are otherwise being generated by the scrap material 70.

In some embodiments, each of the systems 700 and 1000 results in the same advantages of the systems 10, 500, and 905. Each of the systems 700 and 1000, however, uses shipping containers 705-725 to provide the walls 25c-25f, and the system 7000 uses the shipping containers 705-725 to provide a portion of the ductwork 80; the return 85; and/or the plenum 87. However, the containment systems 505 and 905 are not limited to shipping containers and any type of construction is possible. For example, the walls 25c-25f and/or the walls that form the second internal chamber 510 may be formed from a tilt-up construction, etc.

Figure 15:
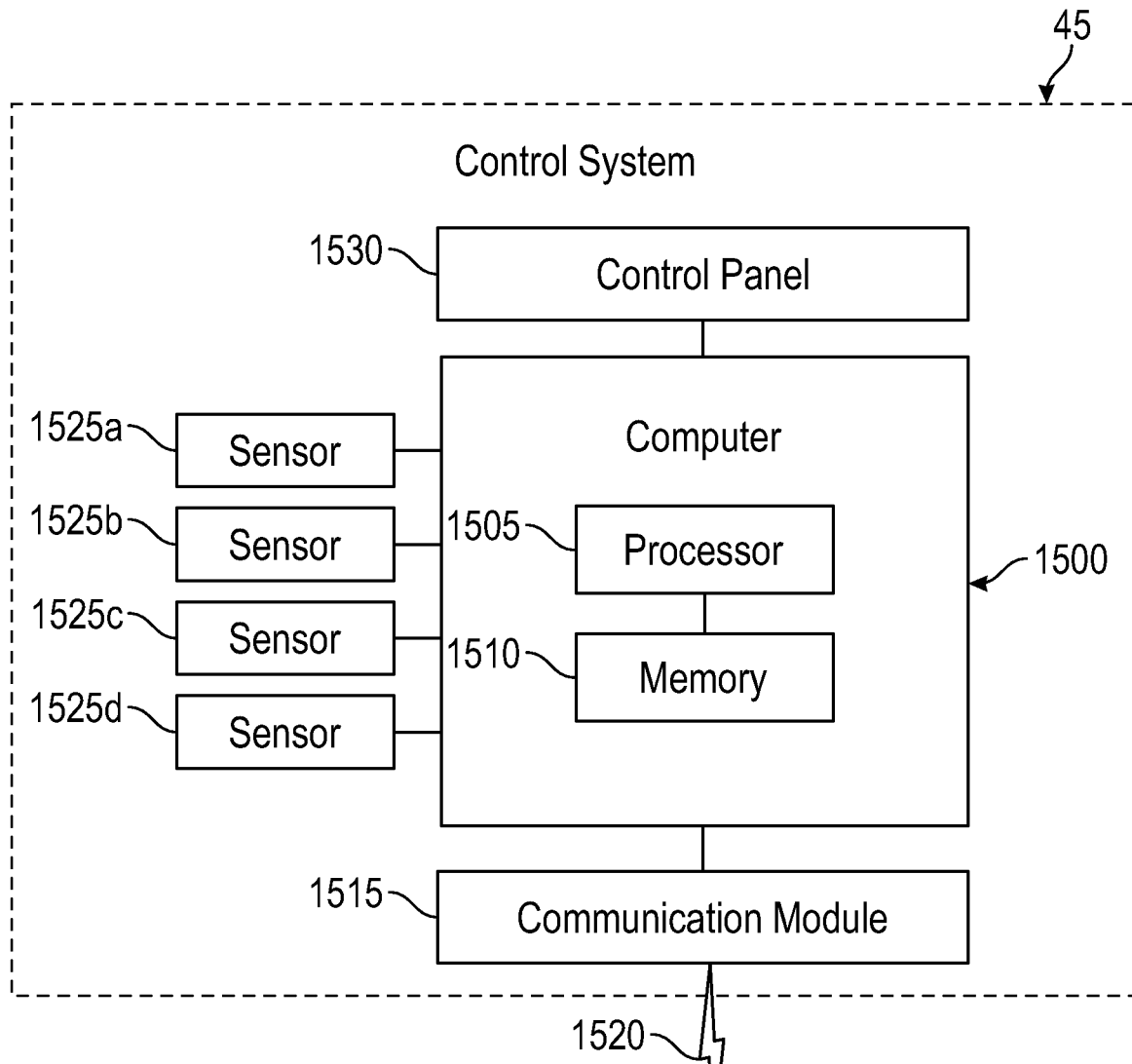
FIG. 15 is a diagrammatic illustration of an example embodiment of the control system of one or more of FIGS. 1, 6, and 9, according to an example embodiment.

The systems 10, 15, 500, 505, 700, 905, 910, and/or 1000 can be altered in a variety of ways. For example, and as illustrated in FIG. 15, the control system 45 includes a computer 1500 including a processor 1505 and a computer readable medium or memory 1510 operably coupled thereto. In an example embodiment, instructions accessible to, and executable by, the processor 1505 are stored in the memory 1510. In an example embodiment, the memory 1510 includes one or more databases and/or one or more data structures stored therein. A communication module 1515 is operably coupled to the computer 1500 and is adapted to be in two-way communication with the containment systems 15, 505 and/or 910, the filter assembly 40, and/or a remote user device via a network 1520. Sensors 1525a, 1525b, 1525c, and 1525d are operably coupled to the computer 1500. The control panel 1530 is operably coupled to the computer 1500.

In an example embodiment, each of the sensors 1525a, 1525b, 1525c, and 1525d includes one or more sensors. In some embodiments, any one of the sensors 1525a, 1525b, 1525c, and 1525d is a position sensor that determines: the position of the cover portion 760 of the movable roof 520; the position of one the doors 730, 735, 740, and 745; and the position of the dampers such as 55, 1040, 1045, 1060, and 1065. Moreover, any one of the sensors 1525a, 1525b, 1525c, and 1525d may be an emission sensor positioned in each of the first and second internal chambers 25 and 510 to determine the level of emissions in each.

In an example embodiment, the network 1520 includes the Internet, one or more local area networks, one or more wide area networks, one or more cellular networks, one or more wireless networks, one or more voice networks, one or more data networks, one or more communication systems, and/or any combination thereof.

In several example embodiments, the computer 1500 includes, and/or functions as, a data acquisition unit that is adapted to convert, condition and/or process signals transmitted by the sensors 1525a, 1525b, 1525c, and 1525d, and one or more other sensors operably coupled to the computer 1500. In an example embodiment, the control panel 1530 is a touch screen, a multi-touch screen, and/or any combination thereof. In several example embodiments, the control panel 1530 includes one or more input devices such as, for example, one or more keypads, one or more voice-recognition systems, one or more touch-screen displays and/or any combination thereof. In several example embodiments, the control panel 1530 includes one or more output devices such as, for example, one or more displays such as, for example, one or more digital displays, one or more liquid crystal displays and/or any combination thereof, one or more printers and/or any combination thereof. In several example embodiments, the control panel 1530 includes one or more card readers, one or more graphical-user interfaces and/or other types of user interfaces, one or more digital ports, one or more analog ports, one or more signal ports, one or more alarms, and/or any combination thereof. In several example embodiments, the computer 1500 and/or the processor 1505 includes, for example, one or more of the following: a programmable general-purpose controller, an application specific integrated circuit (ASIC), other controller devices and/or any combination thereof.

In some embodiments, and using the sensors 1525a-1525d, the control system 45 can start the filter assembly 40 and open/close the dampers 55, 1040, 1045, 1060, and 1065 to provide a minimum air flow through the chambers 25 and/or 510. As such, safety controls can be added to the system 10 to prevent the likelihood that the emissions 75 are being produced in one of the chambers 25 and 510 when the material 70 is completely shielded in every direction without the filter assembly 40 being activated. Moreover, the dampers 55, 1040, 1045, 1060, and/or 1065 can be manipulated during activation of the filter assembly 40 so that airflow is altered within the internal chambers 25 and/or 510 to maximize the collections of the emissions 75. In some embodiments, the systems 10, 500, 700, and/or 900 include a closed-loop control system in which the positioning of the dampers 55, 1040, 1045, 1060, and/or 1065 are altered to maximize a flow through one of the chambers 25 and 510, which is measured by a flow sensor.

In some embodiments, there are no moving parts to the spark trap 35 and no power is required to filter sparks via the spark trap 35. However, in other embodiments, the control system 45 is in communication with the spark trap 35, the spark trap 35 is coupled to a power source, and the control system 45 controls the operation of the spark trap 35. In some embodiments, the spark trap 35 is any spark arrestor or device that prevents sparks or debris that are prone to produce sparks from passing out of the spark arrestor.

Figure 16:
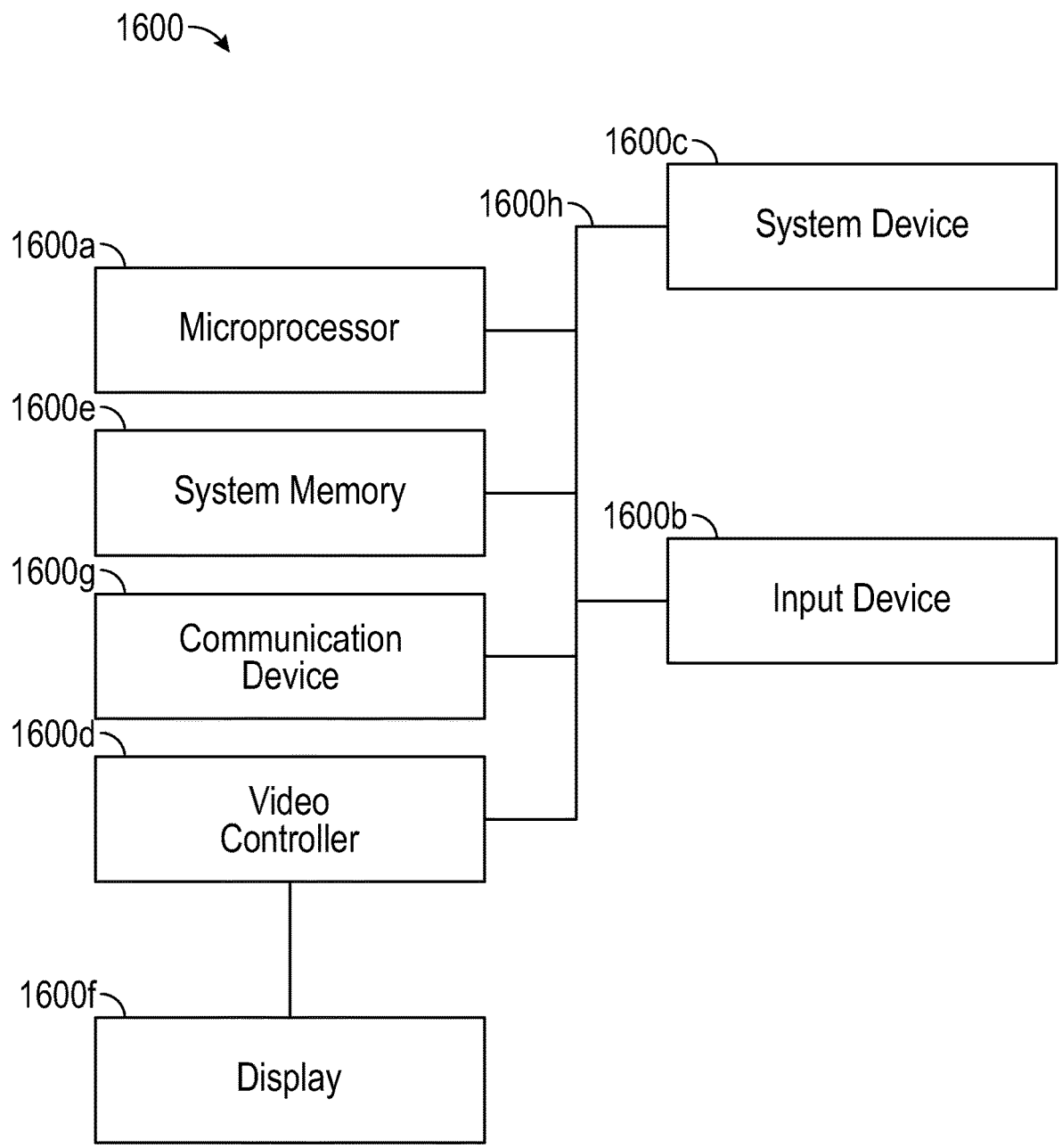
FIG. 16 is a diagrammatic illustration of a node for implementing one or more example embodiments of the present disclosure, according to an example embodiment.

In an example embodiment, as illustrated in FIG. 16 with continuing reference to FIGS. 1-12, 13A, 13B, 14A, 14B, and 16, an illustrative node 1600 for implementing one or more of the example embodiments described above and/or illustrated in FIGS. 1-12, 13A, 13B, 14A, 14B, and 16 is depicted. The node 1600 includes a microprocessor 1600a, an input device 1600b, a storage device 1600c, a video control system 1600d, a system memory 1600e, a display 1600f, and a communication device 1600g, all interconnected by one or more buses 1600h. In several example embodiments, the storage device 1600c may include a floppy drive, hard drive, CD-ROM, optical drive, any other form of storage device and/or any combination thereof. In several example embodiments, the storage device 1600c may include, and/or be capable of receiving, a floppy disk, CD-ROM, DVD-ROM, or any other form of computer-readable medium that may contain executable instructions. In several example embodiments, the communication device 1600g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones, and cell phones.

In several example embodiments, one or more of the components of the systems described above and/or illustrated in FIGS. 1-13, 14A, 14B, 15A, 15B, and 16 include at least the node 1600 and/or components thereof, and/or one or more nodes that are substantially similar to the node 1600 and/or components thereof. In several example embodiments, one or more of the above-described components of the node 1600, the systems 10, 500, 700, 900, and 1000 and/or the example embodiments described above and/or illustrated in FIGS. 1-13, 14A, 14B, 15A, 15B, and 16 include respective pluralities of same components.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In some embodiments, a plurality of instructions stored on a non-transitory computer readable medium may be executed by one or more processors to cause the one or more processors to carry out in whole or in part, execute in whole or in part, implement in whole or in part, or control in whole or in part, the above-described operation of each of the above-described embodiments of the system 10, the above-described execution of each of the above-described embodiments of the method 400 or 600, or any combination thereof. In some embodiments, such one or more processors may include one or more of the microprocessor 1600a, any processor(s) that are part of the components of the systems 10, 500, 700, 900, and 1000 or any combination thereof, and such a computer readable medium may be distributed among one or more components of the systems 10, 500, 700, 900, and 1000. In some embodiments, such a processor may execute the plurality of instructions in connection with a virtual computer system. In some embodiments, such a plurality of instructions may communicate directly with the one or more processors, and/or may interact with one or more operating systems, middleware, firmware, other applications, or any combination thereof, to cause the one or more processors to execute the instructions.

In one aspect, the disclosure describes an emissions collection system that includes a containment system that includes a plurality of walls and a roof structure that together form an internal chamber; wherein chamber inlets are formed in one wall of the plurality of walls; and wherein chamber outlets are formed in either another wall of the plurality of walls or the roof structure; a filter assembly including a filter that collects emissions generated within the internal chamber; and a duct system that places the chamber outlets in fluid communication with the filter assembly; wherein the filter assembly is configured to move air through the chamber inlets, the internal chamber, the chamber outlets, the duct system, and the filter to collect the emissions generated within the internal chamber. In one embodiment, the system also includes a spark trap that is placed in series with the duct system such that the air passes through the spark trap before entering the filter assembly. In one embodiment, the one wall includes a door. In one embodiment, the chamber inlets include louvers that are fixed in an open position. In one embodiment, the chamber outlets are formed in the roof structure.

In another aspect, the disclosure describes an emissions collection system that includes a containment system that includes a plurality of walls that together form a first bay; a roof system that is movable between a first configuration and a second configuration; wherein, when in the first configuration, the roof system covers the first bay to form a first internal chamber; and wherein, when in the second configuration, the roof system exposes the first bay to an external environment; a filter assembly including a filter that collects emissions generated within the first internal chamber; and a duct system that places the first internal chamber in fluid communication with the filter assembly; wherein the filter assembly is configured to collect the emissions generated within the first internal chamber. In one embodiment, the roof system includes: tracks that are coupled to the plurality of walls; and a cover that is movable relative to the tracks and the plurality of walls; wherein, when in the first configuration, the cover covers the first bay to form the first internal chamber; and wherein, when in the second configuration, the cover does not cover the first bay to expose the first bay to the external environment. In one embodiment, the plurality of walls of the containment system also form a second bay that is distinct from the first bay; wherein, when in the first configuration, the cover exposes the second bay to the external environment; and wherein, when in the second configuration, the cover covers the second bay to form a second internal chamber. In one embodiment, the containment system further includes: first door(s) that extend between two walls of the plurality of walls that form the first bay; and second door(s) that extend between two walls of the plurality of walls that form the second bay; wherein the containment system has a first end defined in part by the first door(s) and an opposing end defined in part by the second door(s); wherein, when in the first configuration, the cover is proximate the first door(s) and is spaced from the second door(s); and wherein, when in the second configuration, the cover is proximate the second door(s) and is spaced from the first door(s). In one embodiment, the system also includes a spark trap that is placed in series with the duct system such that the air and the emissions pass through the spark trap before entering the filter assembly. In one embodiment, the duct system forms one wall of the plurality of walls and includes a plenum that extends between the first bay and the second bay; and wherein the containment system further includes: first dampers that place the first internal chamber in fluid communication with the plenum when in an open position and reduce the fluid communication between the plenum and the first internal chamber when in a closed position; and second dampers that place the second internal chamber in fluid communication with the plenum when in an open position and reduce the fluid communication between the plenum and the second internal chamber when in a closed position. In one embodiment, the duct system includes: ductwork that extends across the cover; wherein the ductwork defines a first opening that extends beyond an edge of a first end of the cover and a second opening that extends beyond an edge of a second, opposing end of the cover; first and second dampers; wherein each of the first and second dampers is positioned between the first opening and the second opening; and a return that extends between the first bay and the second bay; wherein the roof system includes an outlet that extends through the cover and is in fluid communication with the ductwork that extends across the cover; wherein the outlet is positioned between the first and second dampers such that: the first damper places the outlet in fluid communication with the first opening when in an open position and reduces the fluid communication between the outlet and the first opening when in a closed position; and the second damper places the outlet in fluid communication with the second opening when in an open position and reduces the fluid communication between the outlet and the second opening when in a closed position; wherein, when the cover is in the first configuration: the first opening is coupled to the return; the first damper is in the open position to place the outlet in fluid communication with the first opening and the return; and the second damper is in the closed position to reduce the fluid communication between the outlet and the second opening; and wherein, when the cover is in the second configuration: the second opening is coupled to the return; the second damper is in the open position to place the outlet in fluid communication with the second opening and the return; and the first damper is in the closed position to reduce the fluid communication between the outlet and the first opening.

In yet another aspect, the disclosure describes a method of containing emissions that includes positioning a first recyclable element in a first bay of a containment system when the first bay is exposed to an external environment; after positioning the first recyclable element in the first bay, covering the first bay with a roofing system to shield the first recyclable element from the external environment in multiple directions thereby forming a first internal chamber; activating a filter assembly to move air from the first internal chamber and into a filter assembly; dismantling the first recyclable element within the first internal chamber thereby producing emissions within the first internal chamber; moving the air and the emissions from the first internal chamber into the filter assembly; and containing the emissions from the first internal chamber within the filter assembly. In one embodiment, the containment system includes a plurality of walls that form the first bay; wherein the roofing system includes: tracks that are coupled to the plurality of walls that form the first bay; and a cover portion that moves relative to the tracks and the plurality of walls that form the first bay; and wherein covering the first bay with the roofing system includes moving the cover portion relative to the plurality of walls that form the first bay. In one embodiment, the plurality of walls also forms a second bay that is substantially similar to but spaced from the first bay; and wherein covering the first bay with the roofing system exposes the second bay to the external environment. In one embodiment, the method also includes: positioning a second recyclable element in the second bay when the second bay is exposed to the external environment and when the first bay is covered by the roofing system; after positioning the second recyclable element in the second bay, covering the second bay with the roofing system to shield the second recyclable element from the external environment in multiple directions thereby forming a second internal chamber while simultaneously exposing the first bay to the external environment; activating the filter assembly to move air from the second internal chamber and into the filter assembly; dismantling the second recyclable element within the second internal chamber thereby producing emissions within the second internal chamber; moving the air and the emissions from the second internal chamber into the filter assembly; and containing the emissions from the second internal chamber within the filter assembly.

In still yet another aspect, the disclosure describes a method of collecting emissions generated within a first internal chamber of a containment system, wherein the containment system includes a plurality of walls and a roof structure that together form the first internal chamber, wherein the method includes: moving air through chamber inlets formed in one wall of the plurality of walls and into the first internal chamber; moving the air and the emissions from the first internal chamber and into a duct system; moving the air and the emissions from the duct system into a filter assembly; and containing the emissions within the filter assembly. In one embodiment, the containment system forms a second internal chamber; wherein the duct system includes a plenum that extends between the first internal chamber and the second internal chamber; wherein the containment system further includes: first dampers that place the first internal chamber in fluid communication with the plenum when in an open position and reduce the fluid communication between the plenum and the first internal chamber when in a closed position; and second dampers that place the second internal chamber in fluid communication with the plenum when in an open position and reduce the fluid communication between the plenum and the second internal chamber when in a closed position; and wherein the method further includes opening the first dampers and closing the second dampers prior to moving the air and the emissions from the first internal chamber and into the duct system. In one embodiment, the containment system forms a second internal chamber; wherein the roof structure includes: a cover portion that moves relative to the plurality of walls; and an outlet that extends through the cover portion; wherein the duct system includes: ductwork that extends across the cover; wherein the ductwork defines a first opening that extends beyond an edge of a first end of the cover and a second opening that extends beyond an edge of a second, opposing end of the cover; first and second dampers; wherein each of the first and second dampers is positioned between the first opening and the second opening; and a return that extends between the first internal chamber and the second internal chamber; wherein the outlet is in fluid communication with the ductwork that extends across the cover and is positioned between the first and second dampers such that: the first damper places the outlet in fluid communication with the first opening when in an open position and reduces the fluid communication between the outlet and the first opening when in a closed position; and the second damper places the outlet in fluid communication with the second opening when in an open position and reduces the fluid communication between the outlet and the second opening when in a closed position; wherein, when the cover is in a first configuration: the first opening is coupled to the return; the first damper is in the open position to place the outlet in fluid communication with the first opening and the return; and the second damper is in the closed position to reduce the fluid communication between the outlet and the second opening; and wherein, when the cover is in a second configuration: the second opening is coupled to the return; the second damper is in the open position to place the outlet in fluid communication with the second opening and the return; and the first damper is in the closed position to reduce the fluid communication between the outlet and the first opening; and wherein the method further includes opening the first damper and closing the second damper prior to moving the air and the emissions from the first internal chamber and into the duct system. In one embodiment, the method also includes moving the air and the emissions through a spark trap that is positioned in series with the duct system to prevent sparks from entering the filter assembly. In one embodiment, the filter assembly includes a fan and wherein the fan pulls the air through the chamber inlets, through the first internal chamber, and into the filter assembly. In one embodiment, the method also includes dismantling an element within the first internal chamber to produce the emissions.

It is understood that variations may be made in the foregoing without departing from the scope of the disclosure. Furthermore, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "vertical," "horizontal," "angular," "upwards," "downwards," "side-to-side," "left-to-right," "right-to-left," "top-to-bottom," "bottom-to-top," "top," "bottom," "bottom-up," "top-down," "front-to-back," etc., are for the purpose of illustration only and do not limit the specific orientation or location of the structure described above.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, means-plus-function clauses are intended to cover the structures described herein as performing the recited function and not only structural equivalents, but also equivalent structures. Moreover, it is the express intention of the applicant not to invoke 35 U.S.C. § 112 (f) for any limitations of any of the claims herein, except for those in which the claim expressly uses the word "means" together with an associated function.

What is claimed is:

1. An emissions collection system comprising:
a containment system comprising a plurality of walls and a roof structure that together form an internal chamber;
wherein chamber inlets are formed in one wall of the plurality of walls; and
wherein chamber outlets are formed in either another wall of the plurality of walls or the roof structure;
a filter assembly comprising a filter that collects emissions generated within the internal chamber; and
a duct system that places the chamber outlets in fluid communication with the filter assembly;
wherein the filter assembly is configured to move air through the chamber inlets, the internal chamber, the chamber outlets, the duct system, and the filter to collect the emissions generated within the internal chamber.

2. The emissions collection system of claim 1, further comprising a spark trap that is placed in series with the duct system such that the air passes through the spark trap before entering the filter assembly.

3. The emissions collection system of claim 1, wherein the one wall comprises a door.

4. The emissions collection system of claim 1, wherein the chamber inlets comprise louvers that are fixed in an open position.

5. The emissions collection system of claim 1, wherein the chamber outlets are formed in the roof structure.

6. An emissions collection system comprising:
a containment system comprising a plurality of walls that together form a first bay;
a roof system that is movable between a first configuration and a second configuration;
wherein, when in the first configuration, the roof system covers the first bay to form a first internal chamber; and
wherein, when in the second configuration, the roof system exposes the first bay to an external environment;
a filter assembly comprising a filter that collects emissions generated within the first internal chamber; and
a duct system that places the first internal chamber in fluid communication with the filter assembly;
wherein the filter assembly is configured to collect the emissions generated within the first internal chamber.

7. The emissions collection system of claim 6, wherein the roof system comprises:
tracks that are coupled to the plurality of walls; and
a cover that is movable relative to the tracks and the plurality of walls;
wherein, when in the first configuration, the cover covers the first bay to form the first internal chamber; and
wherein, when in the second configuration, the cover does not cover the first bay to expose the first bay to the external environment.

8. An emissions collection system comprising:
a containment system comprising a plurality of walls that together form a first bay and a second bay that is distinct from the first bay;
a roof system that is movable between a first configuration and a second configuration;
wherein the roof system comprises:
tracks that are coupled to the plurality of walls; and
a cover that is movable relative to the tracks and the plurality of walls;
wherein, when in the first configuration:
the cover covers the first bay to form a first internal chamber; and
the cover exposes the second bay to an external environment; and
wherein, when in the second configuration:
the cover does not cover the first bay to expose the first bay to the external environment; and
the cover covers the second bay to form a second internal chamber;
a filter assembly comprising a filter that collects emissions generated within the first internal chamber; and
a duct system that places the first internal chamber in fluid communication with the filter assembly;
wherein the filter assembly is configured to collect the emissions generated within the first internal chamber.

9. The emissions collection system of claim 8, wherein the containment system further comprises:
first door(s) that extend between two walls of the plurality of walls that form the first bay; and
second door(s) that extend between two walls of the plurality of walls that form the second bay;
wherein the containment system has a first end defined in part by the first door(s) and an opposing end defined in part by the second door(s);
wherein, when in the first configuration, the cover is proximate the first door(s) and is spaced from the second door(s); and
wherein, when in the second configuration, the cover is proximate the second door(s) and is spaced from the first door(s).

10. The emissions collection system of claim 6, further comprising a spark trap that is placed in series with the duct system such that the air and the emissions pass through the spark trap before entering the filter assembly.

11. The emissions collection system of claim 8,
wherein the duct system forms one wall of the plurality of walls and comprises a plenum that extends between the first bay and the second bay; and
wherein the containment system further comprises:
first dampers that place the first internal chamber in fluid communication with the plenum when in an open position and reduce the fluid communication between the plenum and the first internal chamber when in a closed position; and
second dampers that place the second internal chamber in fluid communication with the plenum when in an open position and reduce the fluid communication between the plenum and the second internal chamber when in a closed position.

12. The emissions collection system of claim 8,
wherein the duct system comprises:
ductwork that extends across the cover;
wherein the ductwork defines a first opening that extends beyond an edge of a first end of the cover and a second opening that extends beyond an edge of a second, opposing end of the cover;
first and second dampers;
wherein each of the first and second dampers is positioned between the first opening and the second opening; and
a return that extends between the first bay and the second bay;
wherein the roof system comprises an outlet that extends through the cover and is in fluid communication with the ductwork that extends across the cover;
wherein the outlet is positioned between the first and second dampers such that:
the first damper places the outlet in fluid communication with the first opening when in an open position and reduces the fluid communication between the outlet and the first opening when in a closed position; and
the second damper places the outlet in fluid communication with the second opening when in an open position and reduces the fluid communication between the outlet and the second opening when in a closed position;
wherein, when the cover is in the first configuration:
the first opening is coupled to the return;
the first damper is in the open position to place the outlet in fluid communication with the first opening and the return; and the second damper is in the closed position to reduce the fluid communication between the outlet and the second opening; and wherein, when the cover is in the second configuration:
the second opening is coupled to the return;
the second damper is in the open position to place the outlet in fluid communication with the second opening and the return; and
the first damper is in the closed position to reduce the fluid communication between the outlet and the first opening.

13. A method of containing emissions comprising:
positioning a first recyclable element in a first bay of a containment system when the first bay is exposed to an external environment;
after positioning the first recyclable element in the first bay, covering the first bay with a roofing system to shield the first recyclable element from the external environment in multiple directions thereby forming a first internal chamber;
activating a filter assembly to move air from the first internal chamber and into a filter assembly;
dismantling the first recyclable element within the first internal chamber thereby producing emissions within the first internal chamber;
moving the air and the emissions from the first internal chamber into the filter assembly; and
containing the emissions from the first internal chamber within the filter assembly.

14. The method of claim 13,
wherein the containment system comprises a plurality of walls that form the first bay;
wherein the roofing system comprises:
tracks that are coupled to the plurality of walls that form the first bay; and
a cover portion that moves relative to the tracks and the plurality of walls that form the first bay; and
wherein covering the first bay with the roofing system comprises moving the cover portion relative to the plurality of walls that form the first bay.

15. The method of claim 14,
wherein the plurality of walls also forms a second bay that is substantially similar to but spaced from the first bay; and
wherein covering the first bay with the roofing system exposes the second bay to the external environment.

16. The method of claim 15, further comprising:
positioning a second recyclable element in the second bay when the second bay is exposed to the external environment and when the first bay is covered by the roofing system;
after positioning the second recyclable element in the second bay, covering the second bay with the roofing system to shield the second recyclable element from the external environment in multiple directions thereby forming a second internal chamber while simultaneously exposing the first bay to the external environment;
activating the filter assembly to move air from the second internal chamber and into the filter assembly;
dismantling the second recyclable element within the second internal chamber thereby producing emissions within the second internal chamber;
moving the air and the emissions from the second internal chamber into the filter assembly; and
containing the emissions from the second internal chamber within the filter assembly.

17. A method of collecting emissions generated within a first internal chamber of a containment system, wherein the containment system comprises a plurality of walls and a roof structure that together form the first internal chamber, wherein the method comprises:
positioning a first recyclable element in the first internal chamber;
generating the emissions within the first internal chamber using the first recyclable element;
moving air through chamber inlets formed in one wall of the plurality of walls and into the first internal chamber;
moving the air and the emissions from the first internal chamber and into a duct system;
moving the air and the emissions from the duct system into a filter assembly; and
containing the emissions within the filter assembly.

18. The method of claim 17,
wherein the containment system forms a second internal chamber;
wherein the duct system comprises a plenum that extends between the first internal chamber and the second internal chamber;
wherein the containment system further comprises:
first dampers that place the first internal chamber in fluid communication with the plenum when in an open position and reduce the fluid communication between the plenum and the first internal chamber when in a closed position; and
second dampers that place the second internal chamber in fluid communication with the plenum when in an open position and reduce the fluid communication between the plenum and the second internal chamber when in a closed position;
and
wherein the method further comprises opening the first dampers and closing the second dampers prior to moving the air and the emissions from the first internal chamber and into the duct system.

19. A method of collecting emissions generated within a first internal chamber of a containment system, wherein the containment system comprises a plurality of walls and a roof structure that together form the first internal chamber;
wherein the containment system forms a second internal chamber;
wherein the roof structure comprises:
a cover portion that moves relative to the plurality of walls; and
an outlet that extends through the cover portion;
wherein the duct system comprises:
ductwork that extends across the cover;
wherein the ductwork defines a first opening that extends beyond an edge of a first end of the cover and a second opening that extends beyond an edge of a second, opposing end of the cover;
first and second dampers;
wherein each of the first and second dampers is positioned between the first opening and the second opening; and
a return that extends between the first internal chamber and the second internal chamber;
wherein the outlet is in fluid communication with the ductwork that extends across the cover and is positioned between the first and second dampers such that:
the first damper places the outlet in fluid communication with the first opening when in an open position and reduces the fluid communication between the outlet and the first opening when in a closed position; and the second damper places the outlet in fluid communication with the second opening when in an open position and reduces the fluid communication between the outlet and the second opening when in a closed position;

wherein, when the cover is in a first configuration:
the first opening is coupled to the return;
the first damper is in the open position to place the outlet in fluid communication with the first opening and the return; and
the second damper is in the closed position to reduce the fluid communication between the outlet and the second opening; and wherein, when the cover is in a second configuration:
the second opening is coupled to the return;
the second damper is in the open position to place the outlet in fluid communication with the second opening and the return; and
the first damper is in the closed position to reduce the fluid communication between the outlet and the first opening; and wherein the method comprises:
moving air through chamber inlets formed in one wall of the plurality of walls and into the first internal chamber;
opening the first damper and closing the second damper prior to moving the air and the emissions from the first internal chamber and into the duct system;
moving the air and the emissions from the first internal chamber and into the duct system;
moving the air and the emissions from the duct system into a filter assembly; and
containing the emissions within the filter assembly.

20. The method of claim 17, further comprising moving the air and the emissions through a spark trap that is positioned in series with the duct system to prevent sparks from entering the filter assembly.

21. The method of claim 17, wherein the filter assembly comprises a fan and wherein the fan pulls the air through the chamber inlets, through the first internal chamber, and into the filter assembly.

22. The method of claim 17, further comprising dismantling an element within the first internal chamber to produce the emissions.

* * * * *